(12) United States Patent
Wells

(10) Patent No.: US 10,512,221 B2
(45) Date of Patent: Dec. 24, 2019

(54) LIGHTING SYSTEM AND SENSOR ARRAY FOR GROWING PLANTS

(71) Applicant: LUMIGROW, INC., Emeryville, CA (US)

(72) Inventor: Kevin Wells, San Rafael, CA (US)

(73) Assignee: LUMIGROW, INC., Emeryville, CA (US)

( * ) Notice: Subject to any disclaimer, the term of this patent is extended or adjusted under 35 U.S.C. 154(b) by 0 days.

(21) Appl. No.: 15/969,470

(22) Filed: May 2, 2018

(65) Prior Publication Data

US 2018/0317398 A1 Nov. 8, 2018

Related U.S. Application Data

(60) Provisional application No. 62/500,364, filed on May 2, 2017.

(51) Int. Cl.
| | | |
|---|---|---|
| *H05B 37/02* | (2006.01) | |
| *A01G 7/04* | (2006.01) | |
| *H05B 33/08* | (2006.01) | |
| *F21Y 105/10* | (2016.01) | |
| *F21Y 115/10* | (2016.01) | |

(52) U.S. Cl.
CPC ............ *A01G 7/045* (2013.01); *H05B 33/086* (2013.01); *H05B 33/0845* (2013.01); *H05B 33/0866* (2013.01); *H05B 37/0218* (2013.01); *F21Y 2105/10* (2016.08); *F21Y 2115/10* (2016.08)

(58) Field of Classification Search
CPC ............ H05B 37/0227; H05B 37/0234; H05B 37/0254; H05B 37/0272; H05B 37/0281
USPC .................................................. 315/308, 312
See application file for complete search history.

(56) References Cited

U.S. PATENT DOCUMENTS

| | | |
|---|---|---|
| 8,847,514 B1 | 9/2014 | Reynoso et al. |
| 2004/0105261 A1 | 6/2004 | Ducharme et al. |
| 2013/0293156 A1 | 11/2013 | Wells |
| 2013/0294065 A1 | 11/2013 | Wells |
| 2015/0223402 A1 | 8/2015 | Krijn et al. |
| 2015/0257243 A1 | 9/2015 | Saffari et al. |
| 2015/0305108 A1* | 10/2015 | Probasco ............... A01G 22/00 47/58.1 LS |
| 2015/0342125 A1 | 12/2015 | Krijn et al. |
| 2016/0088802 A1 | 3/2016 | Nicole et al. |
| 2016/0219794 A1 | 8/2016 | Greenberg et al. |
| 2017/0115210 A1* | 4/2017 | Fujiyama ........... G01N 21/3554 |
| 2017/0163439 A1* | 6/2017 | Bosua ................... H04W 76/11 |
| 2018/0242430 A1* | 8/2018 | Gopal Samy ...... H05B 37/0245 |
| 2019/0132930 A1* | 5/2019 | Vangeel ............. H05B 37/0227 |

* cited by examiner

*Primary Examiner* — Tung X Le
(74) *Attorney, Agent, or Firm* — Troutman Sanders LLP

(57) ABSTRACT

A lighting system for facilitating the growth of plants. The system can include an LED array having an output of light, including light intensity and/or color spectra, controlled locally in response to one or more sensors of the respective system detecting a sensory input analyzed against a target parameter set. The LED array and/or corresponding one or more sensors can be disposed on or internal to a housing. The LED array can be protected and a controller of the system can be configured to analyze data from the one or more sensors and adjust output of the LED array in response.

20 Claims, 28 Drawing Sheets

150

153

154

162

LIGHTING SYSTEM AND SENSOR ARRAY FOR GROWING PLANTS

CROSS-REFERENCE TO RELATED APPLICATIONS

This application is a continuation-in-part of U.S. patent application Ser. No. 15/004,320, filed on Jan. 22, 2016, the contents of which are incorporated herein by reference as though fully set forth herein. This application is a continuation-in-part of U.S. patent application Ser. No. 15/406,458, filed on Jan. 13, 2017, the contents of which are incorporated herein by reference as though fully set forth herein. This application claims priority of U.S. Provisional Application No. 62/303,374, filed on Mar. 3, 2016, and to U.S. Provisional Application No. 62/500,364, filed on May 2, 2017, the contents of which are incorporated herein by reference as though fully set forth herein.

BACKGROUND

Field

This disclosure relates generally to facilitating plant growth using light.

Description of the Related Art

Some lighting systems for growing plants utilize gas-based lights and other lighting systems utilize light emitting diodes (LEDs). Gas-based lights include high intensity discharge (HID) lights and compact fluorescent lights (CFL). HID lights include metal halide (MH) and high pressure sodium (HPS) lights. More information regarding lighting systems for growing plants can be found in U.S. Pat. No. 6,688,759 to Hadjimichael, the contents of which are incorporated herein by reference. Information regarding lighting systems that utilize LEDs can be found in U.S. Pat. No. 5,012,609 to Ignatius, et al., U.S. Pat. No. 5,278,432 to Ignatius, et al., U.S. Pat. No. 6,474,838 to Fang, et al., U.S. Pat. No. 6,602,275 to Sullivan, U.S. Pat. No. 6,921,182 to Anderson, et al., U.S. Patent Application Nos. 20040189555 to Capen, et al., 20070058368 to Partee, et al., U.S. Patent Application No. 20110125296 to Bucove, et al., U.S. Patent Application No. 20050030538 to Jaffar and International Application No. PCT/CA2007/001096 to Tremblay, et al., all of which are incorporated by reference as though fully set forth herein.

There are many different manufacturers that use light emitting diodes for the growing of plants. Some of these manufacturers include Homegrown Lights, Inc., which provides the Procyon 100, SuperLED, which provides the LightBlaze 400, Sunshine Systems, which provides the GrowPanel Pro, Theoreme Innovation, Inc., which provides the TI SmartLamp, and HID Hut, Inc., which provides the LED UFO.

However, it is desirable to provide a lighting system which allows the spectrum and/or intensity of the emitted light to be better controlled.

SUMMARY

The present disclosure is directed to a lighting system for facilitating the growth of plants. The lighting system is useful for horticulture applications. The novel features of the disclosure are set forth with particularity in the appended claims. In some embodiments, an LED array can have its output of light, including light intensity and/or color spectra, controlled locally in response to one or more sensors of the respective system detecting a sensory input analyzed against a target parameter set. For example, total daily micro-mol quantity and color ratio could be a target parameter for a given location. The LED array and/or corresponding one or more sensors can be disposed on or internal to a housing. The LED array can therefore be protected and a controller of the system can be configured to analyze data from the one or more sensors and adjust output of the LED array in response.

In other embodiments, a system is disclosed for controlling a plurality of LED arrays, including LED arrays located in one or more separate locations, in a visual manner that includes one or more visual maps. In certain embodiments, there can be at least three separate maps that visualize similar, overlapping and/or separate information corresponding to information sensed at one or more respective LED arrays.

The visual map of this embodiment can include criteria associated with sensed ambient light and/or light from another source, a target parameter defined automatically based on information sensed by sensors or manually established by an end-user (e.g., a grower); and a difference between the preceding at least two parameters and/or sensed information. The respective visual map can be updated continuously in real-time and/or depicted accumulated discrepancies. For example, one visual map can depict daily light integral (DLI) quantities or the map can also depict instantaneous quantities.

In certain embodiments, once one or more LED arrays and/or sensors are arranged at a location, respective sensors are operable to detect information (e.g., light criteria, temperature, humidity, etc.). Detected information can then be analyzed by a local controller on-site or a controller remotely located and, along with location information associated with the sensors, the detected information can be translated into respective visual maps. In certain embodiments, the LED arrays of a location can be in operative communication with a computer, including the computer of an end-user, and information sensed from the sensors can be analyzed, translated, and in response to comparison with target parameters of the location, output of the respective LED array can be adjusted. Information from the sensors can communicated as described in tandem with the corresponding adjustment of LED array output in a nested feedback loop or said communication and adjustment can be done separately.

In some embodiments, visual maps can depict strictly light criteria of the LED array and/or sensed by corresponding sensors as well as temperature, humidity, and other parameters of a given location.

In some embodiments, an apparatus is disclosed for controlling light criteria in response to a target parameter. The apparatus can include a computer and a grow light array operatively coupled to the computer. The grow light array can be directly attached to the computer and/or wirelessly connected therewith. The grow light array can include a first grow light that outputs light. The grow light array can also include a sensor array operatively coupled to the computer, wherein a first sensor of the sensor array is carried by the first grow light. The grow light array adjusts a spectrum of light output by the grow light array to drive a light spectrum sense parameter, determined by the sensor array, to match a desired light spectrum sense parameter of the target parameter.

In some embodiments, the light spectrum sense parameter corresponds to a light spectrum parameter from the grow light array. In some embodiments, the light sense parameter corresponds to a daily micro-mol quantity and color ratio for a plant. In some embodiments, the light spectrum sense parameter corresponds to ambient light. In some embodiments, the light spectrum sense parameter corresponds to light from the grow light array and ambient light.

In some embodiments, the grow light array adjusts a first color spectrum of light. The grow light array can also adjust a second color spectrum of light. In some embodiments, the apparatus can also include a display that depicts a digital light map corresponding to the light spectrum sense parameter. In some embodiments, the grow light array and the sensor array are disposed internal or external to a housing comprising a controller. The controller can be operatively coupled to the sensor array and the grow light array such that the controller receives the target parameter from the computer and adjusts the spectrum of light output by the grow light array based on the target parameter.

In some embodiments, an apparatus is disclosed for controlling light criteria in response to a target parameter. The apparatus can include a computer a grow light array operatively coupled to the computer, wherein the grow light array can include a light emitting diode that outputs light and a sensor operatively coupled to the computer. The sensor can be carried by the grow light array. The grow light array can be configured to adjust a spectrum of light to drive a light spectrum sense parameter, determined by the sensor, to match a desired light spectrum sense parameter of the target parameter.

In some embodiments, the light spectrum sense parameter corresponds to light from the grow light array and ambient light. In some embodiments, the grow light array adjusts a first color spectrum of light. In some embodiments, the first color spectrum of light is adjusted with time. In some embodiments, the grow light array adjusts a second color spectrum of light. The second color spectrum of light can be adjusted with time.

In some embodiments, the apparatus can include a display which displays a digital light map, the digital light map being adjusted with the time. The display can include more than one visual map or can consist of only three visual maps, whereby each visual map can correspond to different criteria, including light criteria sensed by sensors of the system, data from another grow site location, and the like.

In some embodiments, an apparatus is disclosed for controlling light criteria in response to a target parameter. The apparatus can include a computer system that has a display, including a screen and/or interactive graphical user interface. The apparatus can include a grow light array operatively coupled to the computer system, wherein the grow light array includes a light emitting diode and a sensor operatively coupled to the computer system. The sensor can be carried by the grow light array. The grow light array can adjust a spectrum of light to drive a light spectrum sense parameter, determined by the sensor, to match a desired light spectrum sense parameter. The display displays the spectrum of light and desired spectrum of light.

In some embodiments, the light spectrum sense parameter corresponds to light from the grow light and ambient light. In some embodiments, the grow light array adjusts a first color spectrum of light, and the display displays the first color spectrum of light being adjusted. In some embodiments, the first color spectrum of light can be adjusted with time, and the display can display the first color spectrum of light being adjusted with time. In some embodiments, the grow light array adjusts a second color spectrum of light. The second color spectrum of light can be adjusted with time, and the display can display the second color spectrum of light being adjusted with time.

The disclosure will be best understood from the following description when read in conjunction with the accompanying drawings.

BRIEF DESCRIPTION OF THE DRAWINGS

It should be noted that like reference numbers are used throughout the several views of the Drawings.

FIG. 1c is close-up view of an LED of the first LED array of FIG. 1a.

FIG. 1d is close-up view of an LED of the second LED array of FIG. 1a.

DETAILED DESCRIPTION

The disclosure disclosed herein is a lighting system and sensor array for facilitating the growth of plants, wherein the lighting system provides a desired spectrum and intensity of light. The disclosure disclosed herein can be understood with reference to U.S. Pat. Nos. 8,297,782, 8,668,350, 9,310,027, and 9,310,049, the contents of all of which are incorporated herein by reference in their entirety. The disclosure disclosed herein can be understood with reference to the above-identified U.S. patent application Ser. Nos. 15/004,320, 15/406,458, and U.S. Provisional Application No. 62/303,374. The position indications discussed herein can be of many different types of indications, such as an electrical signal. The electrical signal of the position indications can be of many different types of electrical signals, such as a digital and/or analog position signal.

Many greenhouses in northern climates use supplemental light to increase growth of crops in low light seasons and environments. The duration and integrated quantity of light, in the form of Photosynthetically Active Radiation, a plant receives over a day impacts growth, quality, and yield for greenhouse crops. The sum of photons in a unit area over a day, known as Daily Light Integral or DLI, is used by growers to plan crop growth schedules. Although DLI is well correlated to growth, this metric does not address duration of light during a day, known as photoperiod.

Work by Jiao et al. (1989) on roses, and Logendra and James (1992) on tomatoes have shown plants grown under longer photoperiods with a similar DLI produce more overall growth and accumulate a higher dry mass when compared to shorter photoperiods. To determine the optimal photoperiod for currently relevant day-neutral horticultural crops we grew plants under the same DLI with different photoperiods to determine an optimal photoperiod for production. Tomatoes and lettuce were grown in a growth chamber under a DLI of 12 mols/day with 12-Hour, 16-Hour, 20-Hour, and 24-Hour photoperiods to test effects on growth, development, and mass. Tomatoes grown for three weeks under a longer photoperiod of 20-Hours averaged a 45%-67% increase in dry mass and grew 31% to 44% taller in height in comparison to plants with a 12-hour photoperiod. Lettuce showed similar results, as the 20-Hour treatment produced plants with 38% more wet mass and 36% more dry mass in comparison to the 12-Hour treatment. Under a 24-Hour photoperiod, tomatoes developed intumescence and lettuce had significantly less wet and dry mass, suggesting the importance of a dark period. These finding will be tested in a full production greenhouse environment, to explore the benefits of achieving both a target DLI and target photoperiod on marketable yield, by adjusting supplemental light intensity in regards to the light provided by the sun to create an optimal lighting environment.

Figure 1A:
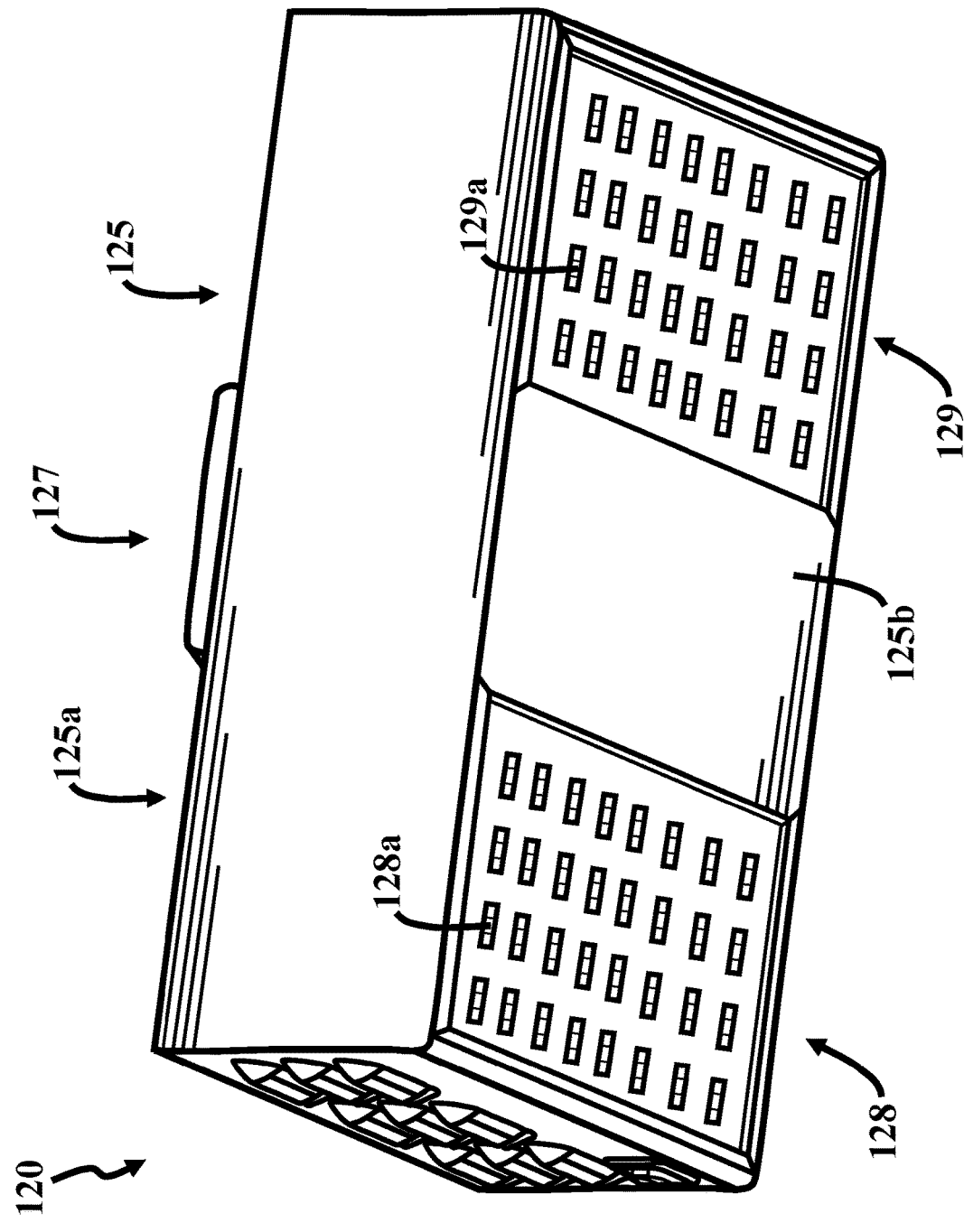
FIG. 1a is a perspective front view, of a grow light, which includes a housing, and first and second LED arrays.
Figure 1B:
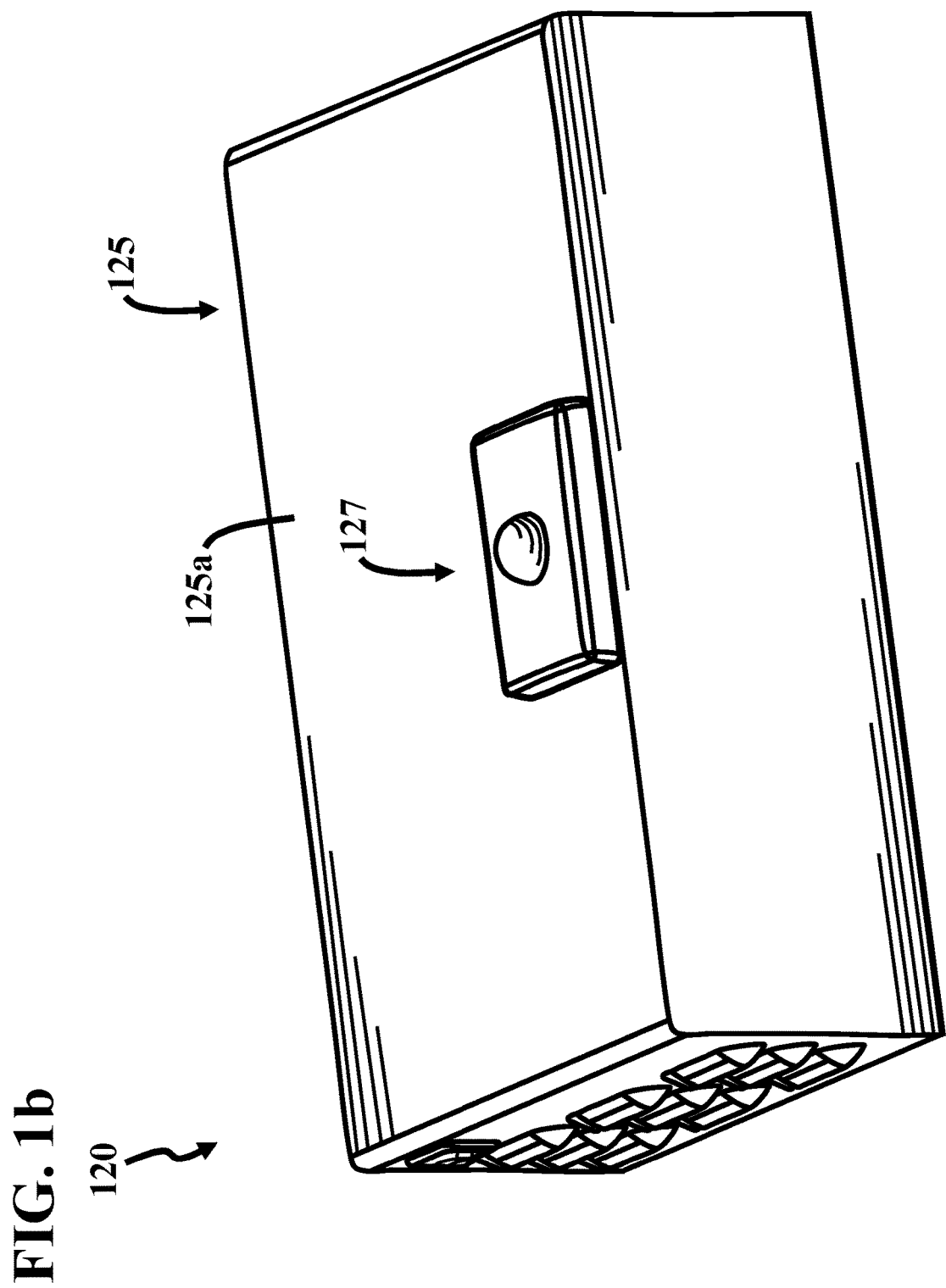
FIG. 1b is a perspective back view of a grow light, which includes a housing, and first and second LED arrays.

FIGS. 1a and 1b are perspective front and back perspective views, respectively, of a grow light 120, which includes a housing 125. In this embodiment, the grow light 120 includes light emitting diode (LED) arrays 128 and 129, which are positioned on a surface 125b of the housing 125. The LED arrays 128 and 129 include a plurality of LEDs 128a and 129a, respectively. In this embodiment, the grow light 120 includes a light sensor 127 (FIG. 2), which is positioned on an opposed surface 125a of the housing 125. The light sensor 127 is integrated with the housing 125 and sensor 127 can be externally and/or internally positioned with the housing 125. The housing 125 can be configured to protected and/or house grow light 120 and corresponding LED arrays 128 and 129.

Figure 1C:
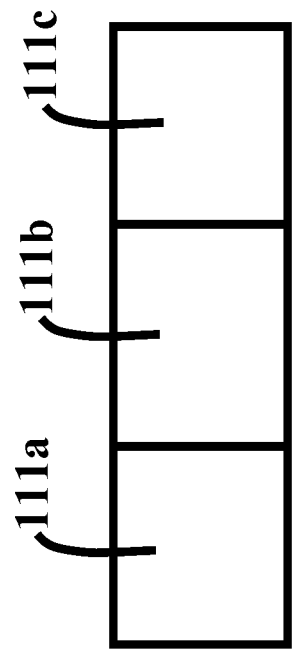

FIG. 1c is close-up view of the LED 128a of the LED array 128. The LEDs 128a can be of many different types. In this embodiment, the LED 128a includes a red portion 110a, green portion 110b, and blue portion 110c, wherein the red portion 110a, green portion 110b, and blue portions 110c provide red, green, and blue light, respectively. It should be noted that the light provided by the portions 110a, 110b, and 110c can be of many other colors of light, such as white light, ultraviolet, violet, yellow, orange, and infrared light. It should be noted that the light provided by the portions 110a, 110b, and 110c are mixed together. In this way, the LED array 128 provides color mixing. The light provided by the portions 110a, 110b, and 110c can be mixed together to provide a desired wavelength spectrum of light and/or a desired intensity of light, as will be discussed in more detail below.

Figure 1D:
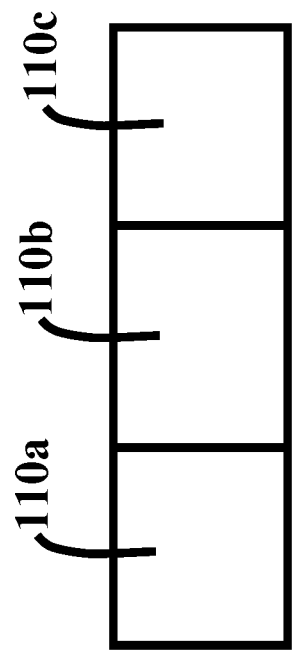

FIG. 1d is close-up view of the LED 129a of the LED array 129. The LEDs 129a can be of many different types. In this embodiment, the LED 129a includes a red portion 111a, green portion 111b, and blue portion 111c, wherein the red portion 111a, green portion 111b, and blue portions 111c provide red, green, and blue light, respectively. It should be noted that the light provided by the portions 111a, 111b, and 111c can be of many other colors of light, such as white light, ultraviolet (UV), violet, yellow, orange, and infrared light (IR). It should be noted that the light provided by the portions 111a, 111b, and 111c are mixed together. In this way, the LED array 129 provides color mixing. The light provided by the portions 111a, 111b, and 111c can be mixed together to provide a desired wavelength spectrum of light and/or a desired intensity of light, as will be discussed in more detail below.

It should be noted that an LED emits light in response to being activated, and an LED does not emit light in response to being deactivated. An LED is activated in response to driving a current through it to a current level above a threshold current level. Further, an LED is deactivated in response to driving a current through it to a current level below the threshold current level. In this embodiment, the LEDs 128a and 129a are activated and deactivated in response to receiving a signal from an LED controller.

It should be noted that the light emitted by the LED arrays 128 and 129 are mixed together. In this way, the LED arrays 128 and 129 provide color mixing. The light of the LED arrays 128 and 129 can be mixed together to provide a desired wavelength spectrum of light and/or a desired intensity of light, as will be discussed in more detail below.

It should also be noted that the intensity of the light emitted by a single LED typically has a Gaussian wavelength distribution. However, some LEDs, such as those which provide white light, have intensities that have non-Gaussian wavelength distributions. An LED which provides white light and has an intensity having a non-Gaussian wavelength distribution.

The wavelength spectrum of the light emitted by an LED can be chosen in response to choosing the band gap energy of the semiconductor material of the LED. The band gap energy of the semiconductor material of the LED is typically chosen by choosing the semiconductor material composition. The semiconductor material composition can be chosen during growth. It should be noted that the wavelength distribution of the light emitted by an LED can be chosen in response to choosing the semiconductor material composition. The semiconductor materials included with different types of LEDs can be of many different types, several of which will be discussed in more detail presently.

LEDs which emit IR light can include many different types of semiconductor materials, such as gallium arsenide and aluminum gallium arsenide. Further, LEDs which emit red light can include many different types of semiconductor materials, such as aluminum gallium arsenide, gallium arsenide phosphide, aluminum gallium indium phosphide and gallium phosphide.

LEDs which emit orange light can include many different types of semiconductor materials, such as gallium arsenide phosphide, aluminum gallium indium phosphide and gallium phosphide. Further, LEDs which emit yellow light can include many different types of semiconductor materials, such as gallium arsenide phosphide, aluminum gallium indium phosphide and gallium phosphide.

LEDs which emit green light can include many different types of semiconductor materials, such as indium gallium nitride/gallium nitride heterostructure, gallium phosphide, aluminum gallium indium phosphide and aluminum gallium phosphide. Further, LEDs which emit blue light can include many different types of semiconductor materials, such as zinc selenide and indium gallium nitride.

LEDs which emit violet light can include many different types of semiconductor materials, such as indium gallium nitride. Further, LEDs which emit ultraviolet light can include many different types of semiconductor materials, such as aluminum nitride, aluminum gallium nitride, and aluminum gallium indium nitride.

LEDs which emit purple light typically include a blue LED coated with a red phosphor or a white LED coated with a purple plastic. LEDs which emit white light can include a blue LED coated with a yellow phosphor.

Hence, the LEDs of LED array 102 can provide light having many different wavelength values, such as those mentioned above. The LEDs of LED array 102 can be provided by many different manufacturers, such as Cree, Inc. of Durham, N.C. and Nichia Corporation of Tokyo, Japan. In this particular embodiment, however, the LEDs of LED array 102 are provided by Philips Lumileds Lighting Company and are referred to as Luxeon-III light emitting diodes.

The LEDs of the LED arrays 128 and 129 include two or more different types of LEDs, which are capable of emitting different wavelength spectrums of light. LEDs of the same type emit the same wavelength spectrums of light, and LEDs of different types emit different wavelength spectrum of light. A wavelength spectrum of light is the intensity of light emitted by the LED versus the wavelength of the light, and corresponds to a color of the light. The wavelengths spectrum of light can be determined in many different ways, such as with a spectrometer. Examples of wavelength spectrums of light are discussed in more detail below.

It should be noted that the conventions for the wavelengths of different colors of light vary widely. However, the wavelengths of light discussed herein will have the following ranges for ease of discussion:

Ultraviolet light (UV): 40 nm to 380 nm;
Violet light: 380 nm to 450 nm;
Blue light: 450 nm to 495 nm;
Green light 495 nm to 570 nm;
Yellow light: 570 nm to 590 nm;
Orange light: 590 nm to 620 nm;
Red light: 620 nm to 750 nm; and
Infrared light (IR): 750 nm to 2500 nm,
wherein the wavelengths above are in nanometers (nm).

It should also be noted that there is typically some wavelength overlap between adjacent colors of light emitted by an LED. For example, wavelengths of blue and green light emitted by an LED typically overlap in a wavelength range of about 485 nanometers to about 505 nanometers. Further, wavelengths of blue and violet light emitted by an LED typically overlap in a wavelength range of about 440 nm to about 460 nm. In this way, the wavelength range of blue light is between about 450 nm to about 495 nm, and the wavelength range of green light is between about 495 nm to about 570 nm.

Figure 2:
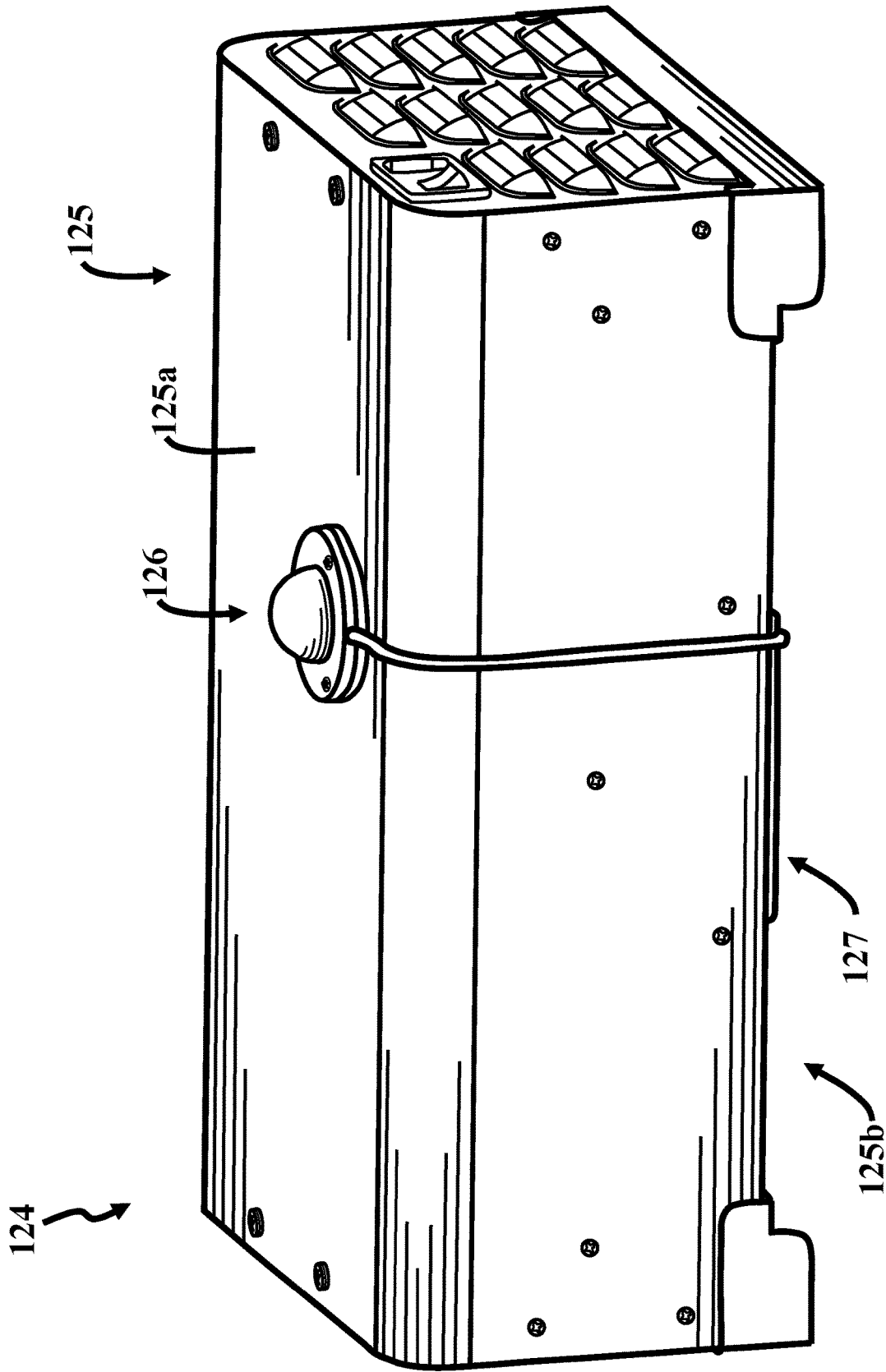
FIG. 2 is a back perspective view of another embodiment of a grow light.

FIG. 2 is a back perspective view of another embodiment of a grow light, denoted as grow light 124. Grow light 124 includes the housing 125 and light sensor 127 positioned on the surface 125b. A sensor 126 is positioned on the surface 125a so that the grow light 124 includes sensors 126 and 127 on opposed surfaces 125a and 125b, respectively. However, sensors 126 and/or 127 can be located on any surface of housing 125 including external and/or internal surfaces that may or may not be depicted.

Figure 3:
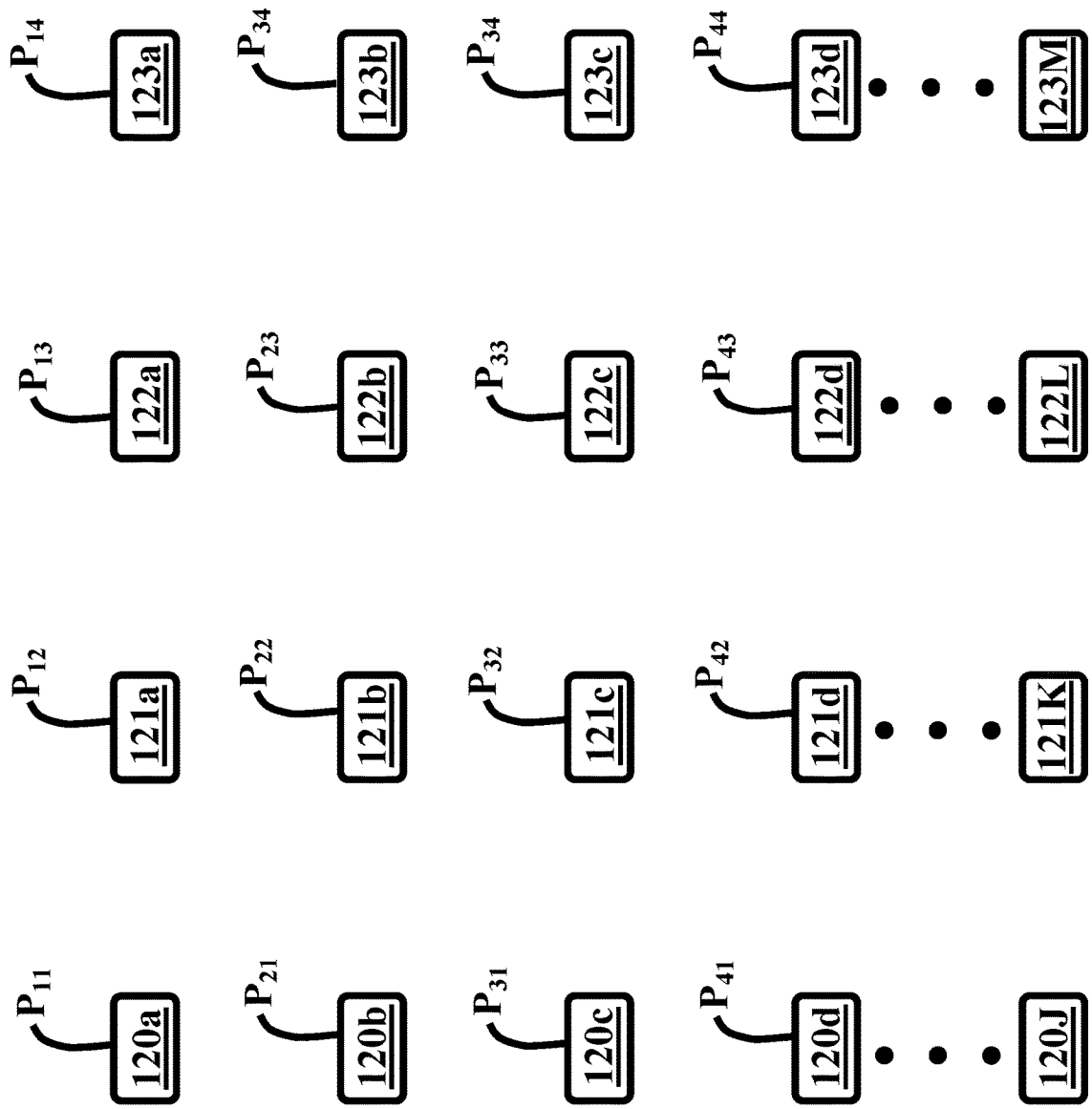
FIG. 3 is a block diagram of a grow light array, which includes a plurality of grow lights.

FIG. 3 is a block diagram of a grow light array 100. In this embodiment, the grow light array 100 includes a plurality of grow lights. In general, the grow light array 100 includes one or more grow lights. The grow lights of the grow light array 100 can be of many different types, such as grow lights 120 and 124 discussed above. The grow lights of the grow light array 100 can include the grow lights disclosed in U.S. Pat. Nos. 8,297,782, 8,668,350, 9,310,027, and 9,310,049, as well as in U.S. patent application Ser. No. 15/004,320 and U.S. Provisional Application No. 62/303,374.

In this embodiment, the grow light array 100 includes grow lights 120a, 121a, 122a, and 123a at positions $P_{11}$, $P_{12}$, $P_{13}$, $P_{14}$, respectively. The grow light array 100 includes grow lights 120b, 121b, 122b, and 123b at positions $P_{21}$, $P_{22}$, $P_{23}$, $P_{34}$, respectively. In this embodiment, the grow light array 100 includes grow lights 120c, 121c, 122c, and 123c at positions $P_{31}$, $P_{32}$, $P_{33}$, $P_{34}$, respectively. The grow light array 100 includes grow lights 120d, 121d, 122d, and 123d at positions $P_{41}$, $P_{42}$, $P_{43}$, $P_{44}$, respectively. It should be noted that the grow light array 100 can include more grow lights, denoted as grow lights 120J, 121K, 122L, and 123M, wherein J, K, L, and M are whole numbers greater than or equal to one. It should also be noted that the grow lights of the grow light array 100 can be the same types of grow lights, or the grow light array 100 can include different types of grow lights. For example, the grow lights 120a and 121a can correspond to the grow lights 120 and 124, respectively.

The positions of the grow lights of the grow light array 100 can correspond to many different positions. In one embodiment, the grow light array 100 is positioned proximate to one or more plants. The grow lights of the grow light array 100 are spaced apart from each other so that the plant(s) receive a desired spectrum and/or intensity of light, as will be discussed in more detail below.

Figure 4:
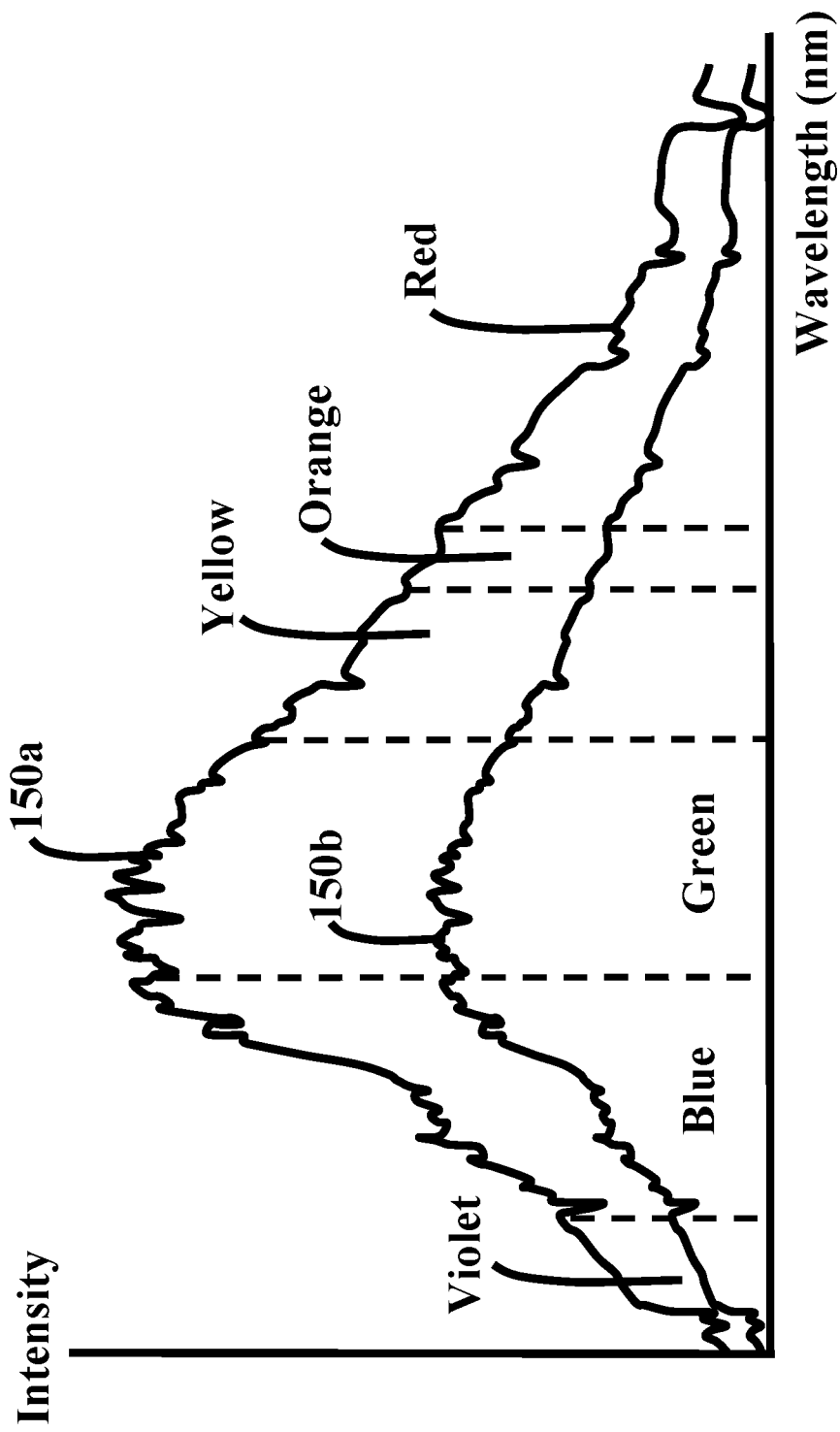
FIG. 4 is a graph of light spectrums, wherein the graph corresponds to the intensity of light verses the wavelength of the light.

FIG. 4 is a graph 150 of light spectrums 150a and 150b, wherein the graph 150 corresponds to the intensity of light verses the wavelength of the light. The graph 150a corresponds to more intense light, and the graph 150b corresponds to less intense light. Hence, the graph 150a corresponds to light with a greater intensity than the light of the graph 150b. Further, the graph 150b corresponds to light with a smaller intensity than the light of the graph 150a. The light of graphs 150a and 150b can be of many different types. In this embodiment, the light of graphs 150a and 150b correspond to a typical wavelength spectrum of sunlight.

In this particular example, the colors of the spectrums 150a and 150b include violet, blue, green, yellow, orange, and red. However, it should be noted that other colors can be used, and the violet, blue, green, yellow, orange, and red colors are included for illustrative purposes. The color of light is related to the frequency and wavelength of the light, wherein the speed of the light (c) is equal to the frequency ($\mathfrak{f}$) multiplied by the wavelength (1) so that c=$\mathfrak{f}$1.11

As is well known, the color violet has a greater frequency than the color blue, the color blue has a greater frequency than the color green, the color green has a greater frequency than the color yellow, the color yellow has a greater frequency than the color orange, and the color orange has a greater frequency than the color red.

Further, the color violet has a smaller wavelength than the color blue, the color blue has a smaller wavelength than the color green, the color green has a smaller wavelength than the color yellow, the color yellow has a smaller wavelength than the color orange, and the color orange has a smaller wavelength than the color red.

As is well known, the color red has a smaller frequency than the color orange, the color orange has a smaller frequency than the color yellow, the color yellow has a smaller frequency than the color green, the color green has a smaller frequency than the color blue, and the color blue has a smaller frequency than the color violet.

As is well known, the color red has a greater wavelength than the color orange, the color orange has a greater wavelength than the color yellow, the color yellow has a greater wavelength than the color green, the color green has a greater wavelength than the color blue, and the color blue has a greater wavelength than the color violet.

Figure 5:
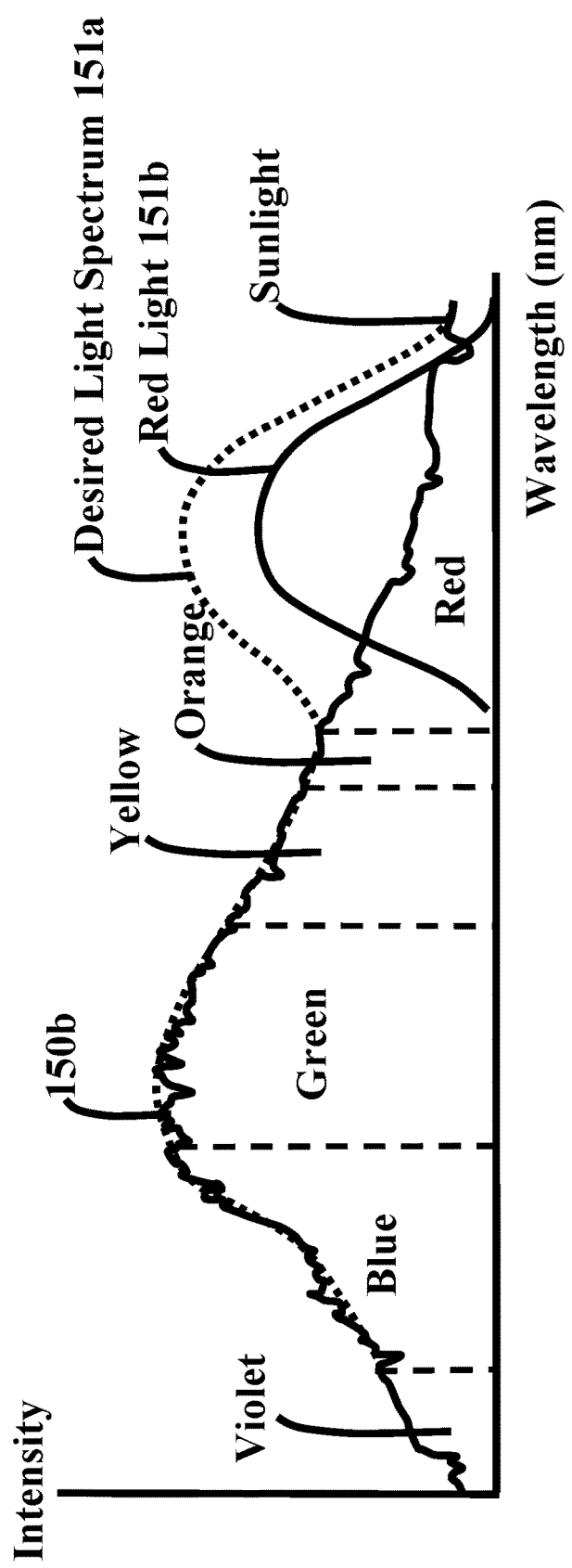
FIG. 5 is a graph of the light spectrum and a desired light spectrum, wherein the light spectrum and desired light spectrum are proximate to each other in the violet, blue, green, yellow, and orange spectrums of light.

FIG. 5 is a graph 151 of the light spectrum 150b and a desired light spectrum 151a. In this embodiment, the light spectrum 150b and desired light spectrum 151a are proximate to each other in the violet, blue, green, yellow, and orange spectrums of light. The desired light spectrum 151a is driven away from the light spectrum 150b in the red color of light in response to red light 151b being provided. The desired light spectrum 151a is driven away from the light spectrum 150b in the red color of light in response to increasing the intensity of the red light 151b. Further, the desired light spectrum 151a is driven towards the light spectrum 150b in the red color of light in response to decreasing the intensity of the red light 151b. The desired light spectrum 151a is driven to match the light spectrum 150b in response to driving the intensity of the red light 151b to zero.

The red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a. In this way, the red portion of light is adjusted to adjust the desired light spectrum 151a.

Figure 6:
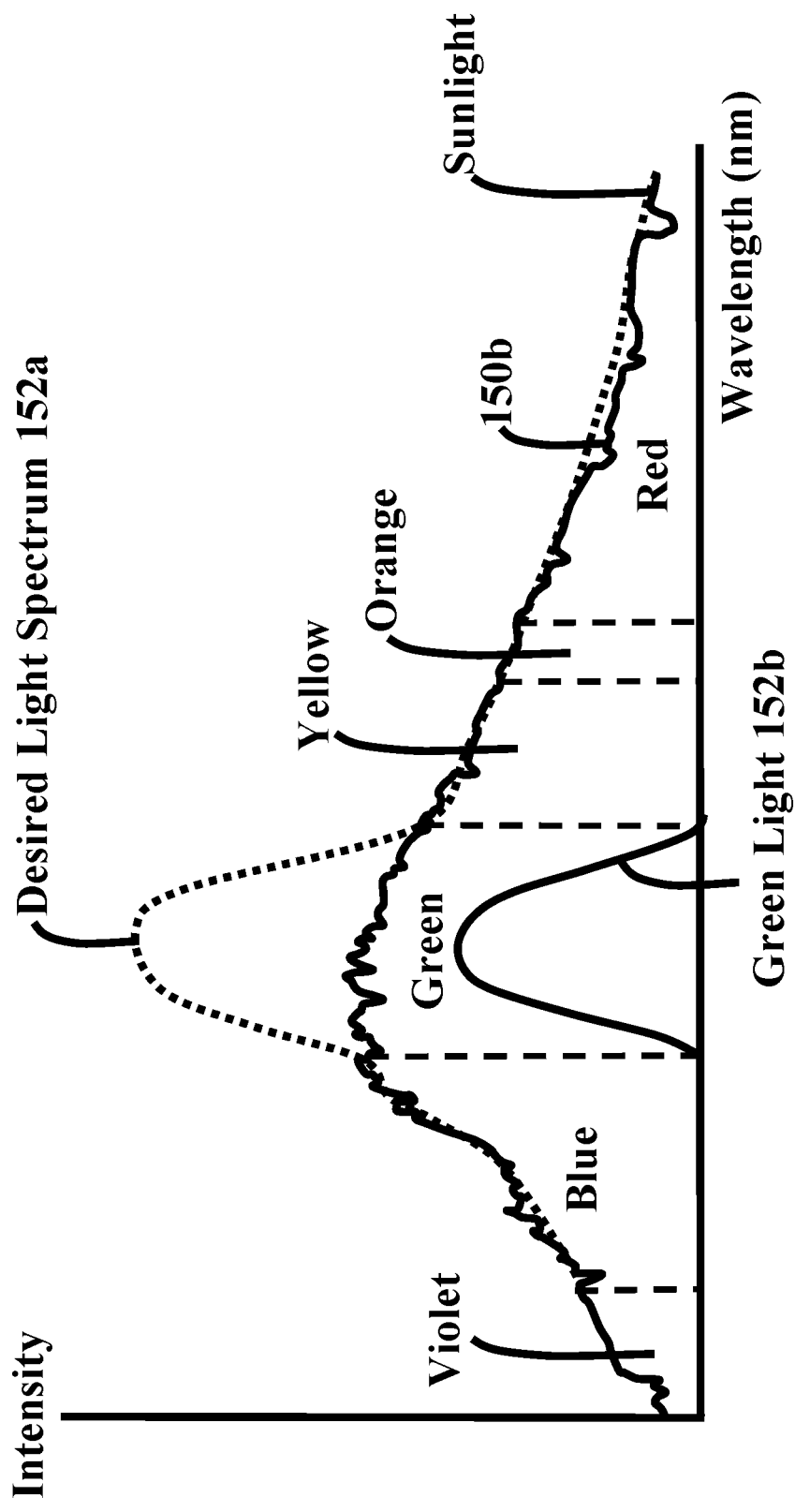
FIG. 6 is a graph of the light spectrum and a desired light spectrum, wherein the light spectrum and desired light spectrum are proximate to each other in the violet, blue, yellow, orange, and red spectrums of light.

FIG. 6 is a graph 152 of the light spectrum 150b and a desired light spectrum 152a. In this embodiment, the light spectrum 150b and desired light spectrum 152a are proximate to each other in the violet, blue, yellow, orange, and red spectrums of light. The desired light spectrum 152a is driven away from the light spectrum 150b in the green color of light in response to green light 152b being provided. The desired light spectrum 152a is driven away from the light spectrum 150b in the green color of light in response to increasing the intensity of the green light 152b. Further, the desired light spectrum 152a is driven towards the light spectrum 150b in the green color of light in response to decreasing the intensity of the green light 152b. The desired light spectrum 152a is driven to match the light spectrum 150b in response to driving the intensity of the green light 152b to zero.

The green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b. In this way, the green portion of light is adjusted to adjust the desired light spectrum 152a.

Figure 7:
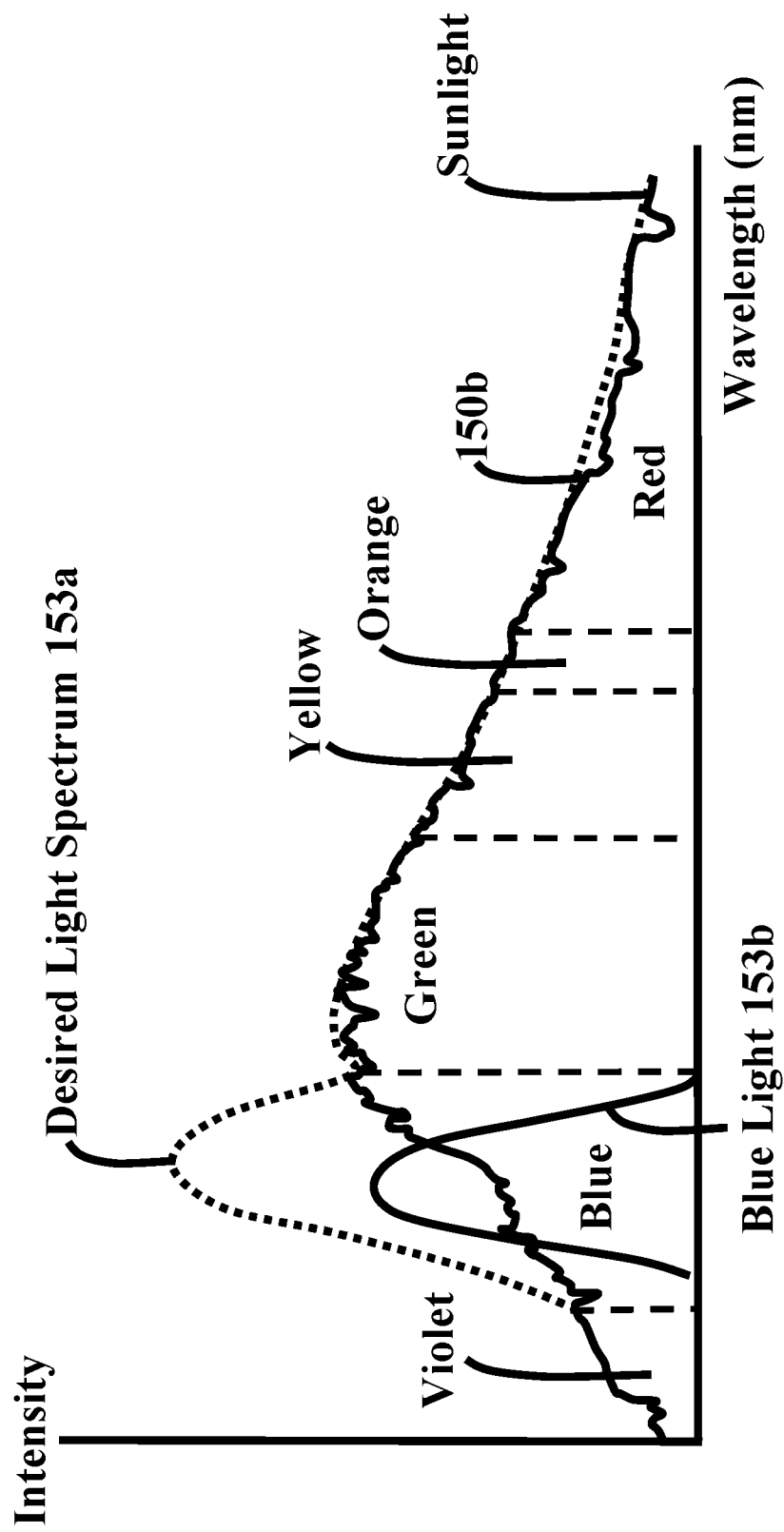
FIG. 7 is a graph of the light spectrum and a desired light spectrum 153a, wherein the light spectrum and desired light spectrum are proximate to each other in the violet, green, yellow, orange, and red spectrums of light.

FIG. 7 is a graph 153 of the light spectrum 150b and a desired light spectrum 153a. In this embodiment, the light spectrum 150b and desired light spectrum 153a are proximate to each other in the violet, green, yellow, orange, and red spectrums of light. The desired light spectrum 153a is driven away from the light spectrum 150b in the blue color of light in response to blue light 153b being provided. The desired light spectrum 153a is driven away from the light spectrum 150b in the blue color of light in response to increasing the intensity of the blue light 153b. Further, the desired light spectrum 153a is driven towards the light spectrum 150b in the blue color of light in response to decreasing the intensity of the blue light 153b. The desired light spectrum 153a is driven to match the light spectrum 150b in response to driving the intensity of the blue light 153b to zero.

The blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the blue portion of light is adjusted to adjust the desired light spectrum 153a.

Figure 8:
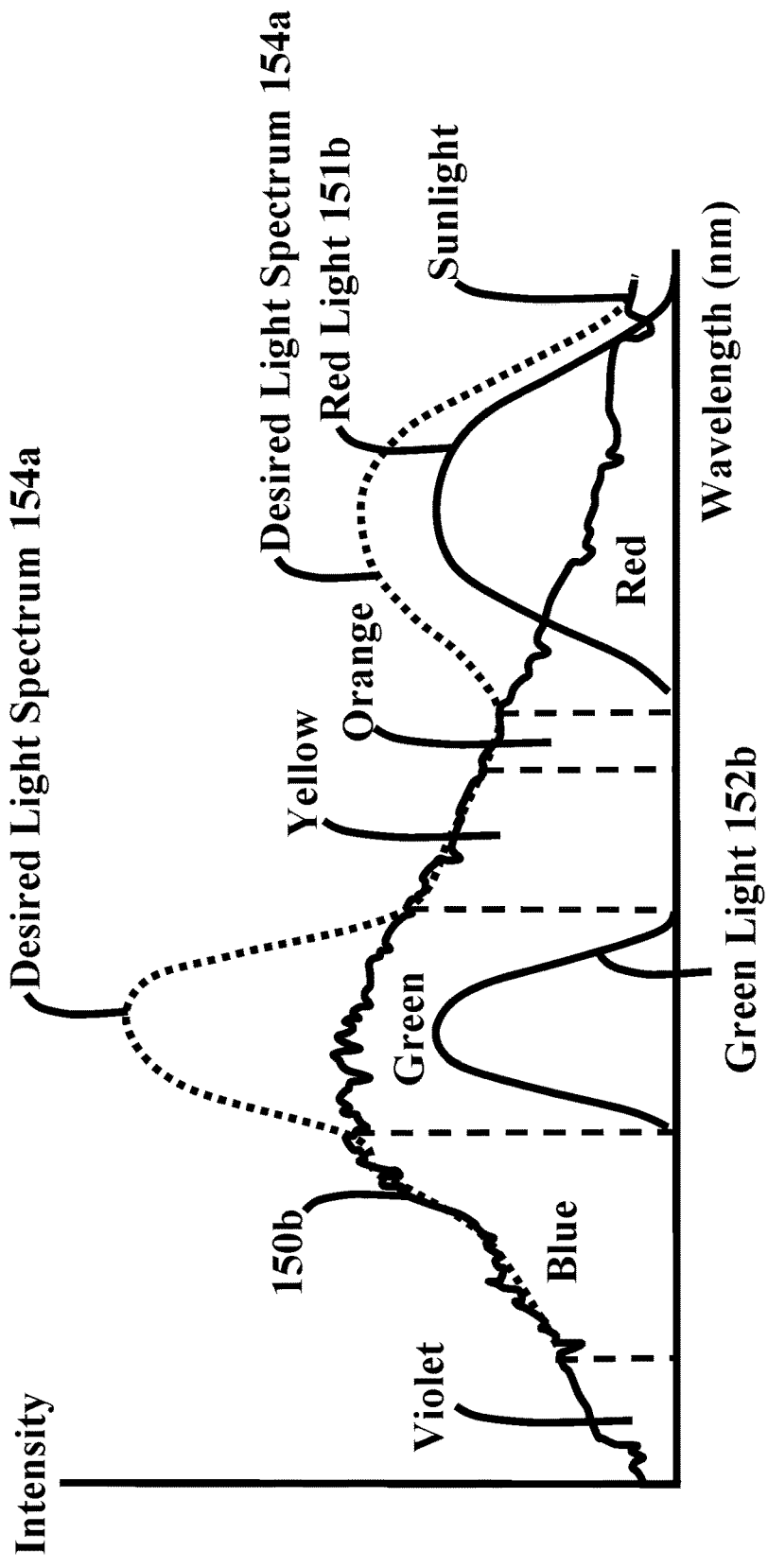
FIG. 8 is a graph of the light spectrum and a desired light spectrum, wherein the light spectrum and desired light spectrum are proximate to each other in the violet, blue, yellow, and orange spectrums of light.

FIG. 8 is a graph 154 of the light spectrum 150b and a desired light spectrum 154a. In this embodiment, the light spectrum 150b and desired light spectrum 154a are proximate to each other in the violet, blue, yellow, and orange spectrums of light. The desired light spectrum 154a is driven away from the light spectrum 150b in the red color of light in response to red light 151b being provided. The desired light spectrum 154a is driven away from the light spectrum 150b in the red color of light in response to increasing the intensity of the red light 151b. Further, the desired light spectrum 154a is driven towards the light spectrum 150b in the red color of light in response to decreasing the intensity of the red light 151b. The desired light spectrum 154a is driven to match the light spectrum 150b in response to driving the intensity of the red light 151b to zero.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a.

Further, the desired light spectrum 154a is driven away from the light spectrum 150b in the green color of light in response to green light 152b being provided. The desired light spectrum 154a is driven away from the light spectrum 150b in the green color of light in response to increasing the intensity of the green light 152b. Further, the desired light spectrum 154a is driven towards the light spectrum 150b in the green color of light in response to decreasing the intensity of the green light 152b. The desired light spectrum 154a is driven to match the light spectrum 150b in response to driving the intensity of the green light 152b to zero.

As mentioned above, the green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b. In this way, the red and/or green portions of light are adjusted to adjust the desired light spectrum 154a.

Figure 9:
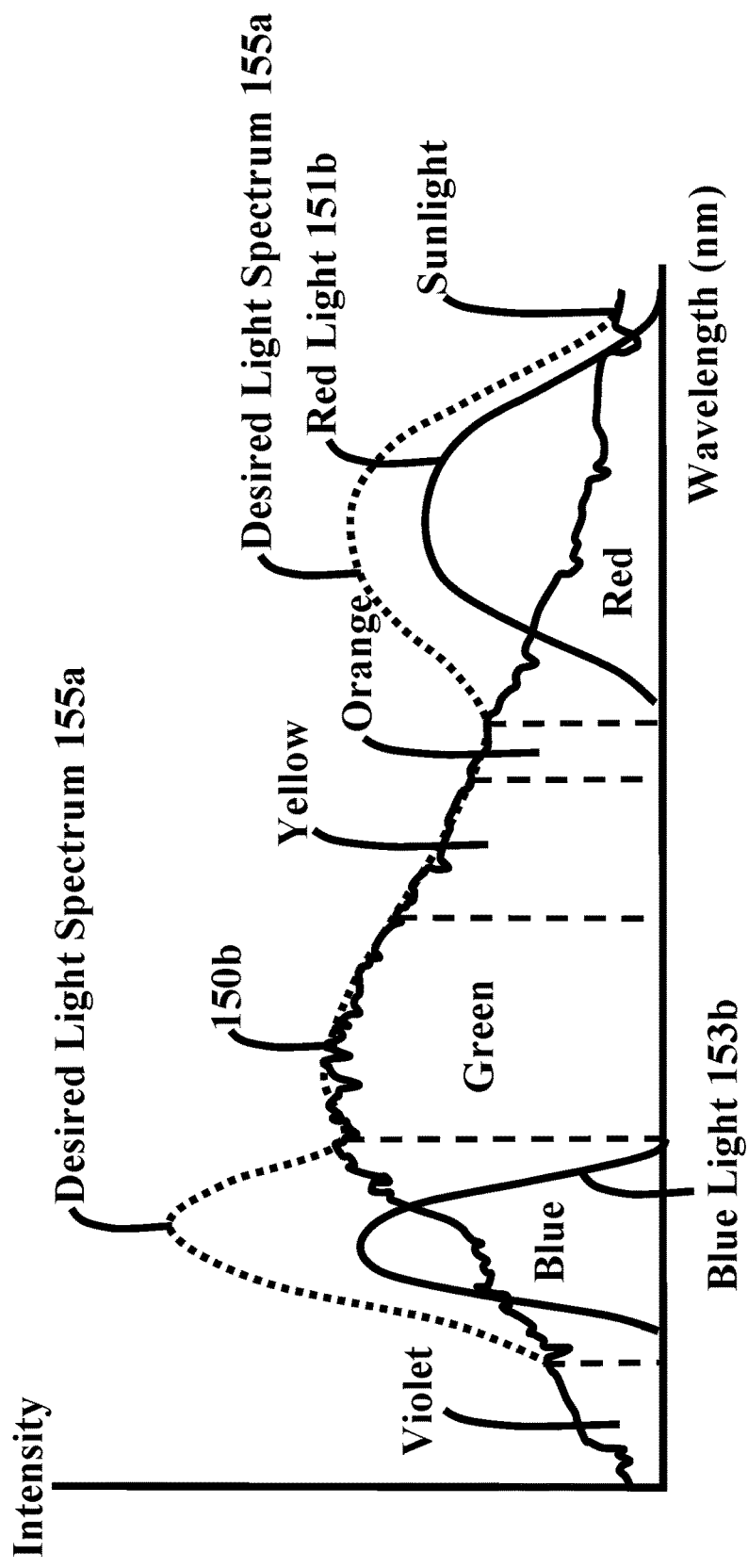
FIG. 9 is a graph of the light spectrum and a desired light spectrum, wherein the light spectrum and desired light spectrum are proximate to each other in the violet, green, yellow, and orange spectrums of light.

FIG. 9 is a graph 155 of the light spectrum 150b and a desired light spectrum 155a. In this embodiment, the light spectrum 150b and desired light spectrum 155a are proximate to each other in the violet, green, yellow, and orange spectrums of light. The desired light spectrum 155a is driven away from the light spectrum 150b in the red color of light in response to red light 151b being provided. The desired light spectrum 155a is driven away from the light spectrum 150b in the red color of light in response to increasing the intensity of the red light 151b. Further, the desired light spectrum 155a is driven towards the light spectrum 150b in the red color of light in response to decreasing the intensity of the red light 151b. The desired light spectrum 155a is driven to match the light spectrum 150b in response to driving the intensity of the red light 151b to zero.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a.

Further, the desired light spectrum 155a is driven away from the light spectrum 150b in the blue color of light in response to blue light 153b being provided. The desired light spectrum 155a is driven away from the light spectrum 150b in the blue color of light in response to increasing the intensity of the blue light 153b. Further, the desired light spectrum 155a is driven towards the light spectrum 150b in the blue color of light in response to decreasing the intensity of the blue light 153b. The desired light spectrum 155a is driven to match the light spectrum 150b in response to driving the intensity of the blue light 153b to zero.15

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the red and/or blue portions of light are adjusted to adjust the desired light spectrum 155a.

Figure 10:
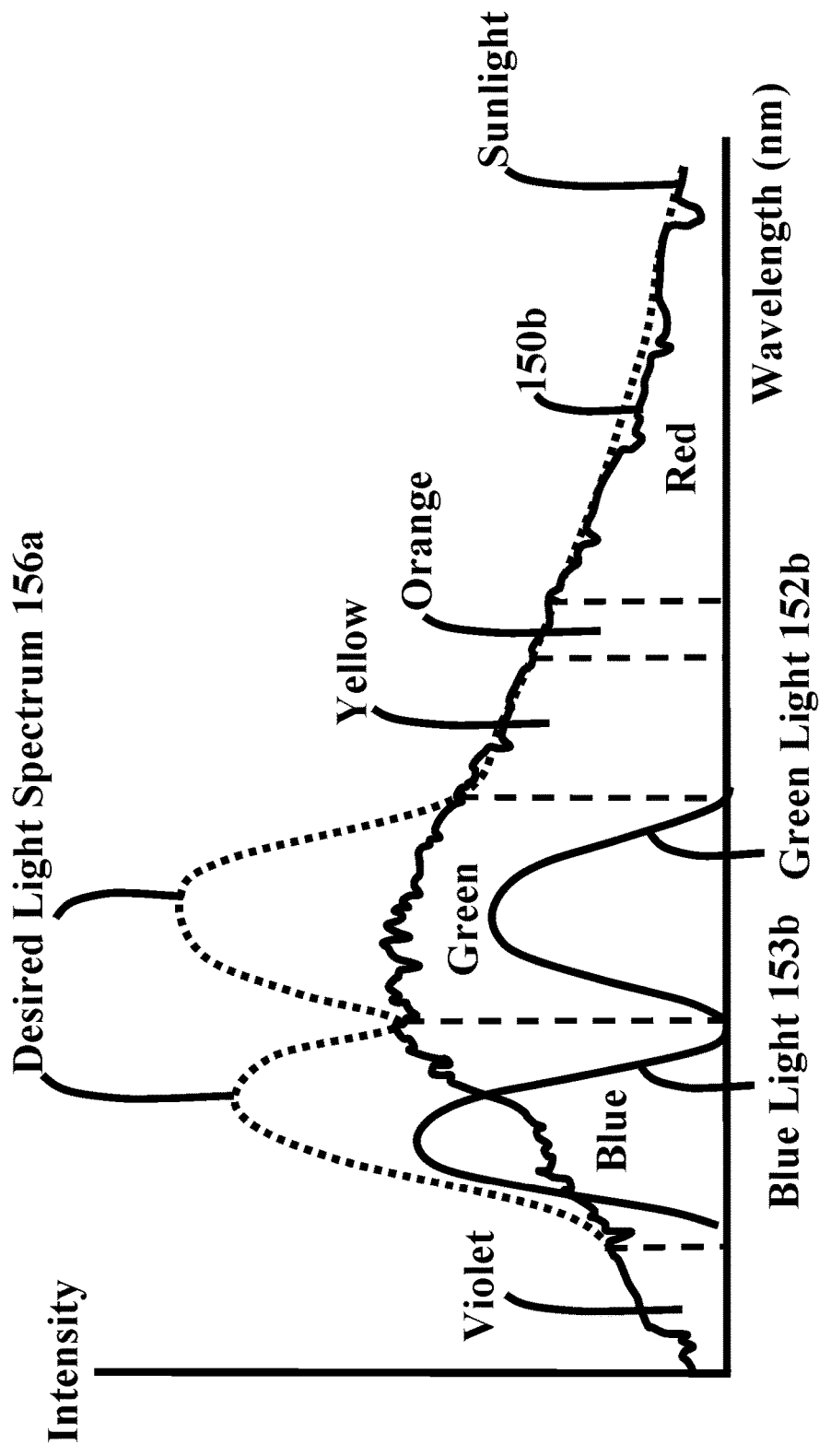
FIG. 10 is a graph of the light spectrum and a desired light spectrum, wherein the light spectrum and desired light spectrum are proximate to each other in the violet, yellow, orange, and red spectrums of light.

FIG. 10 is a graph 156 of the light spectrum 150b and a desired light spectrum 156a. In this embodiment, the light spectrum 150b and desired light spectrum 156a are proximate to each other in the violet, yellow, orange, and red spectrums of light. The desired light spectrum 156a is driven away from the light spectrum 150b in the green color of light in response to green light 152b being provided. The desired light spectrum 156a is driven away from the light spectrum 150b in the green color of light in response to increasing the intensity of the green light 152b. Further, the desired light spectrum 156a is driven towards the light spectrum 150b in the green color of light in response to decreasing the intensity of the green light 152b. The desired light spectrum 156a is driven to match the light spectrum 150b in response to driving the intensity of the green light 152b to zero.

As mentioned above, the green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b.

Further, the desired light spectrum 156a is driven away from the light spectrum 150b in the blue color of light in response to blue light 153b being provided. The desired light spectrum 156a is driven away from the light spectrum 150b in the blue color of light in response to increasing the intensity of the blue light 153b. Further, the desired light spectrum 156a is driven towards the light spectrum 150b in the blue color of light in response to decreasing the intensity of the blue light 153b. The desired light spectrum 156a is driven to match the light spectrum 150b in response to driving the intensity of the blue light 153b to zero.

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the green and/or blue portions of light are adjusted to adjust the desired light spectrum 156a.

Figure 11:
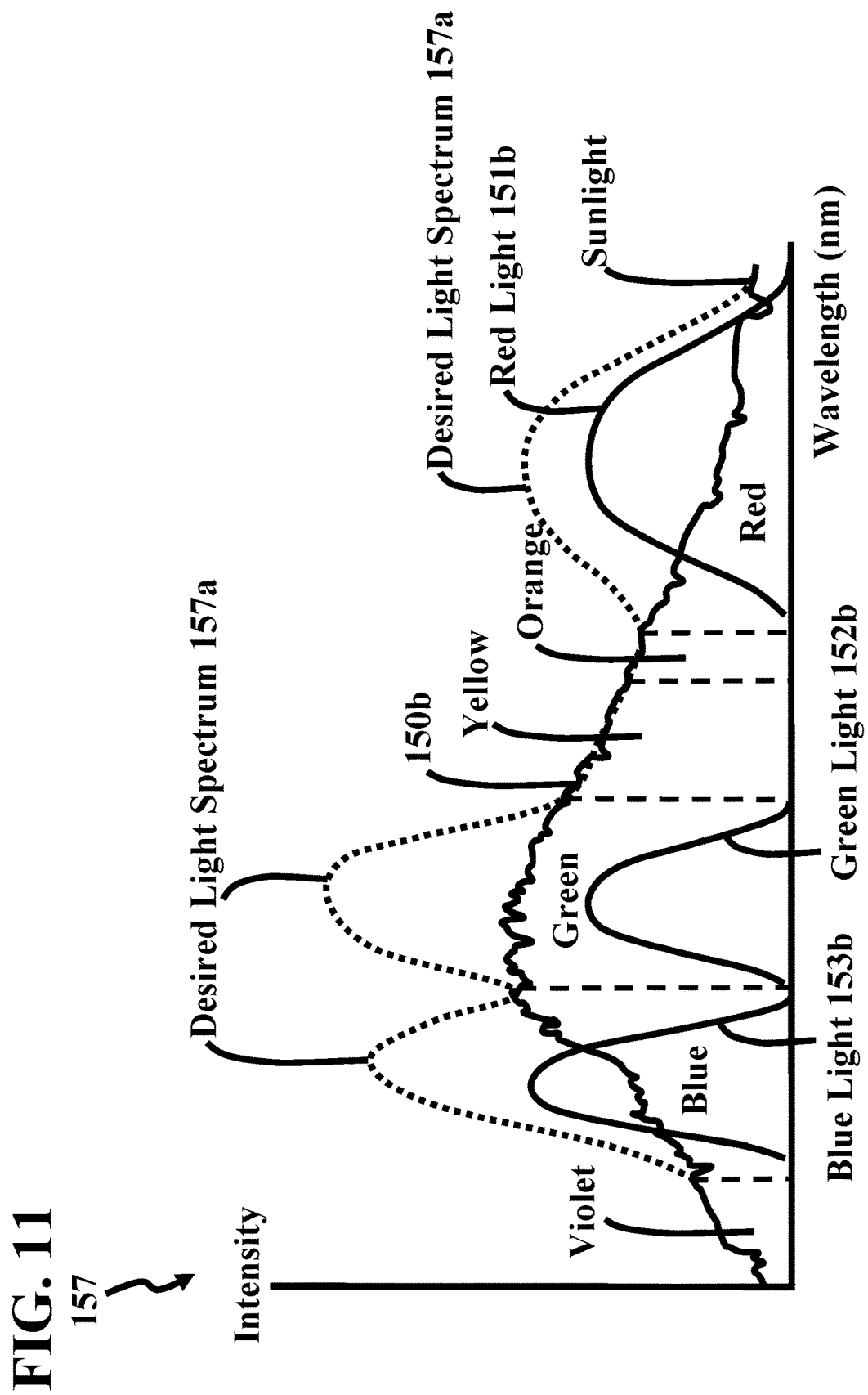
FIG. 11 is a graph of the light spectrum and a desired light spectrum, wherein the light spectrum and desired light spectrum are proximate to each other in the violet, yellow, and orange spectrums of light.

FIG. 11 is a graph 157 of the light spectrum 150b and a desired light spectrum 157a. In this embodiment, the light spectrum 150b and desired light spectrum 157a are proximate to each other in the violet, yellow, and orange spectrums of light. The desired light spectrum 157a is driven away from the light spectrum 150b in the red color of light in response to red light 151b being provided. The desired light spectrum 157a is driven away from the light spectrum 150b in the red color of light in response to increasing the intensity of the red light 151b. Further, the desired light spectrum 157a is driven towards the light spectrum 150b in the red color of light in response to decreasing the intensity of the red light 151b. The desired light spectrum 157a is driven to match the light spectrum 150b in response to driving the intensity of the red light 151b to zero.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a.

Further, the desired light spectrum 157a is driven away from the light spectrum 150b in the green color of light in response to green light 152b being provided. The desired light spectrum 157a is driven away from the light spectrum 150b in the green color of light in response to increasing the intensity of the green light 152b. Further, the desired light spectrum 157a is driven towards the light spectrum 150b in the green color of light in response to 17 decreasing the intensity of the green light 152b. The desired light spectrum 157a is driven to match the light spectrum 150b in response to driving the intensity of the green light 152b to zero.

As mentioned above, the green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b.

Further, the desired light spectrum 157a is driven away from the light spectrum 150b in the blue color of light in response to blue light 153b being provided. The desired light spectrum 157a is driven away from the light spectrum 150b in the blue color of light in response to increasing the intensity of the blue light 153b. Further, the desired light spectrum 157a is driven towards the light spectrum 150b in the blue color of light in response to decreasing the intensity of the blue light 153b. The desired light spectrum 157a is driven to match the light spectrum 150b in response to driving the intensity of the blue light 153b to zero.

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the red, green and/or blue portions of light are adjusted to adjust the desired light spectrum 157a.

Figure 12:
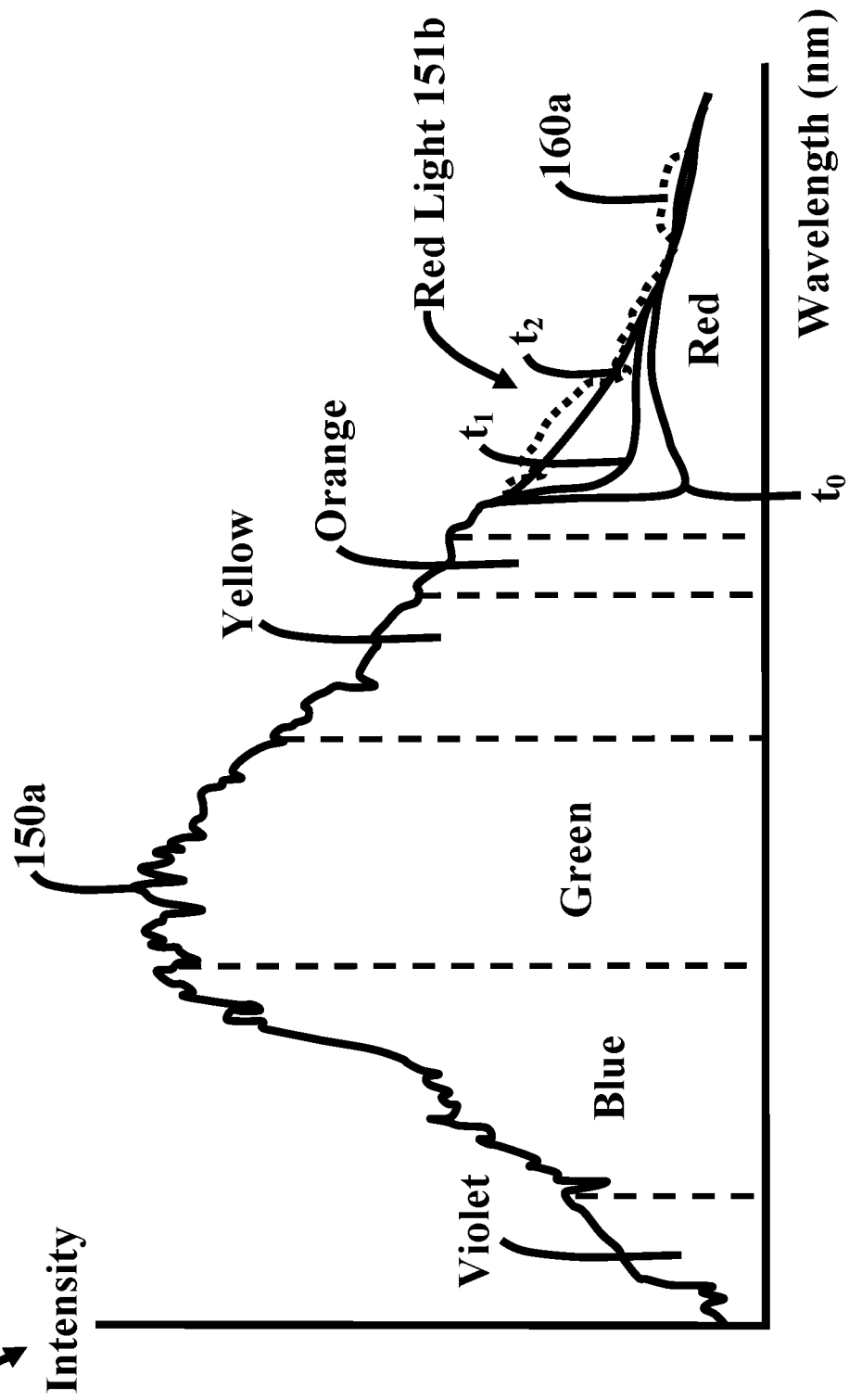
FIG. 12 is a graph of the light spectrum and a desired light spectrum, wherein the light spectrum and desired light spectrum are proximate to each other in the violet, blue, green, yellow, and orange spectrums of light.

FIG. 12 is a graph 160 of the light spectrum 150a and a desired light spectrum 160a. In this embodiment, the light spectrum 150a and desired light spectrum 160a are proximate to each other in the violet, blue, green, yellow, and orange spectrums of light. The light spectrum 150a is driven towards the desired light spectrum 160a in the red color of light in response to the red light 151b being provided. The light spectrum 150a is driven towards the desired light spectrum 160a in the red color of light in response to increasing the intensity of the red light 151b. In this embodiment, a first difference between the light spectrum 150a and the desired light spectrum 160a is decreased in response to increasing the intensity of the red light 151b from a time t0 to a time t1. A second difference between the light spectrum 150a and the desired light spectrum 160a is decreased in response to increasing the intensity of the red light 151b from the time t1 to a time t2. It should be noted that the time t1 is greater than the time to, and the time t2 is greater than the time t1. Further, the time t1 is less than the time t2, and the time t0 is less than the time t1.

In this embodiment, the light spectrum 150a is driven away from the desired light spectrum 160a in the red color of light in response to decreasing the intensity of the red light 151b. In this embodiment, the first difference between the light spectrum 150a and the desired light spectrum 160a is increased in response to decreasing the intensity of the red light 151b. The second difference between the light spectrum 150a and the desired light spectrum 160a is increased in response to decreasing the intensity of the red light 151b.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a. In this way, the red portion of light is adjusted to adjust the light spectrum 150a.

Figure 13:
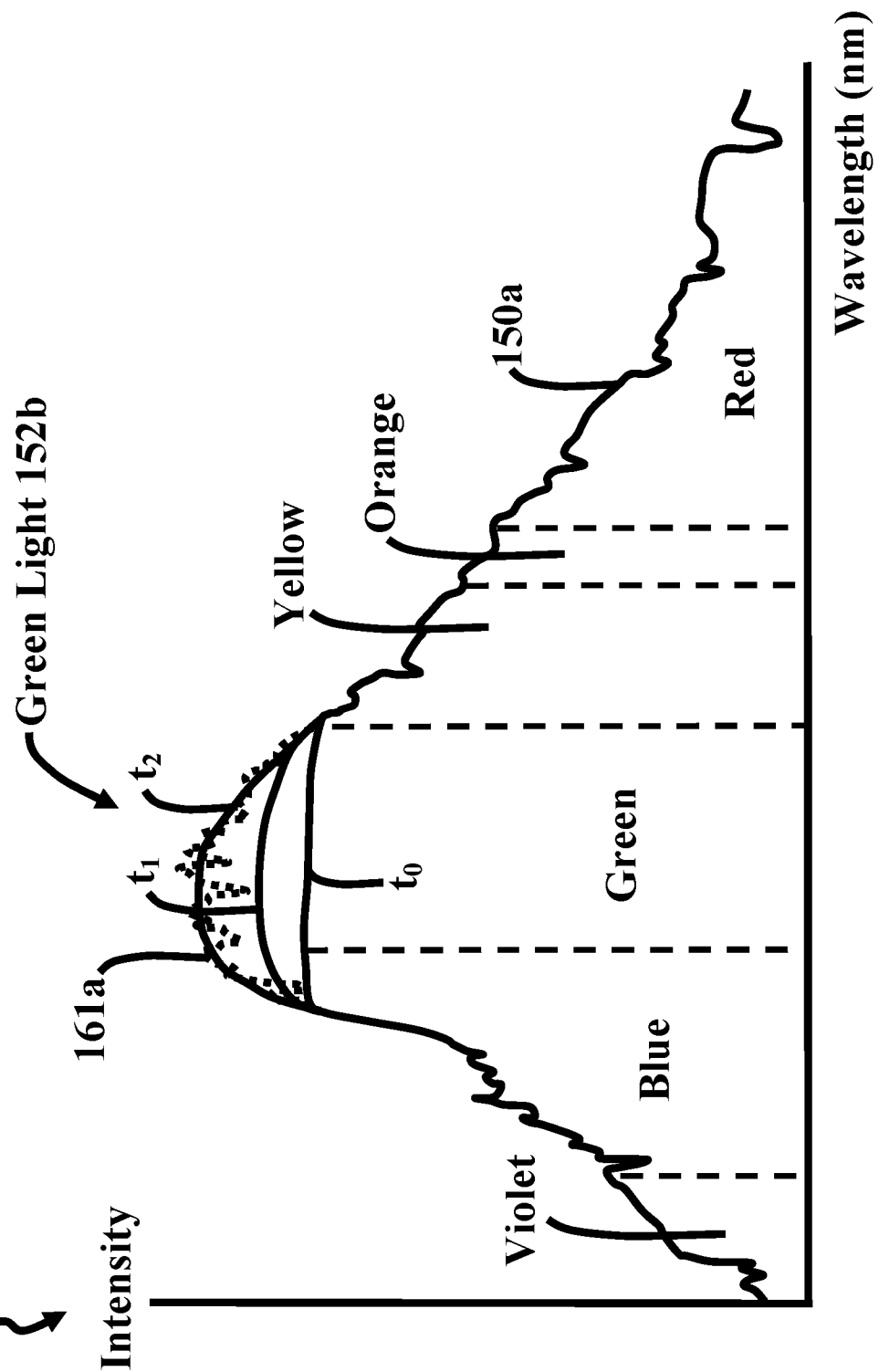
FIG. 13 is a graph of the light spectrum and a desired light spectrum, wherein the light spectrum and desired light spectrum are proximate to each other in the violet, blue, yellow, orange, and red spectrums of light.

FIG. 13 is a graph 161 of the light spectrum 150a and a desired light spectrum 161a. In this embodiment, the light spectrum 150a and desired light spectrum 161a are proximate to each other in the violet, blue, yellow, orange, and red spectrums of light. The light spectrum 150a is driven towards the desired light spectrum 161a in the green color of light in response to the green light 152b being provided. The light spectrum 150a is driven towards the desired light spectrum 161a in the green color of light in response to increasing the intensity of the green light 152b. In this embodiment, a first difference between the light spectrum 150a and the desired light spectrum 161a is decreased in response to increasing the intensity of the green light 152b from the time t0 to the time t1. A second difference between the light spectrum 150a and the desired light spectrum 161a is decreased in response to increasing the intensity of the green light 152b from the time t1 to the time t2.

In this embodiment, the light spectrum 150a is driven away from the desired light spectrum 161a in the green color of light in response to decreasing the intensity of the green light 152b. In this embodiment, the first difference between the light spectrum 150a and the desired light spectrum 161a is increased in response to decreasing the intensity of the green light 152b. The second difference between the light spectrum 150a and the desired light spectrum 161a is increased in response to decreasing the intensity of the green light 152b.

As mentioned above, the green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b. In this way, the green portion of light is adjusted to adjust the light spectrum 150a.

Figure 14:
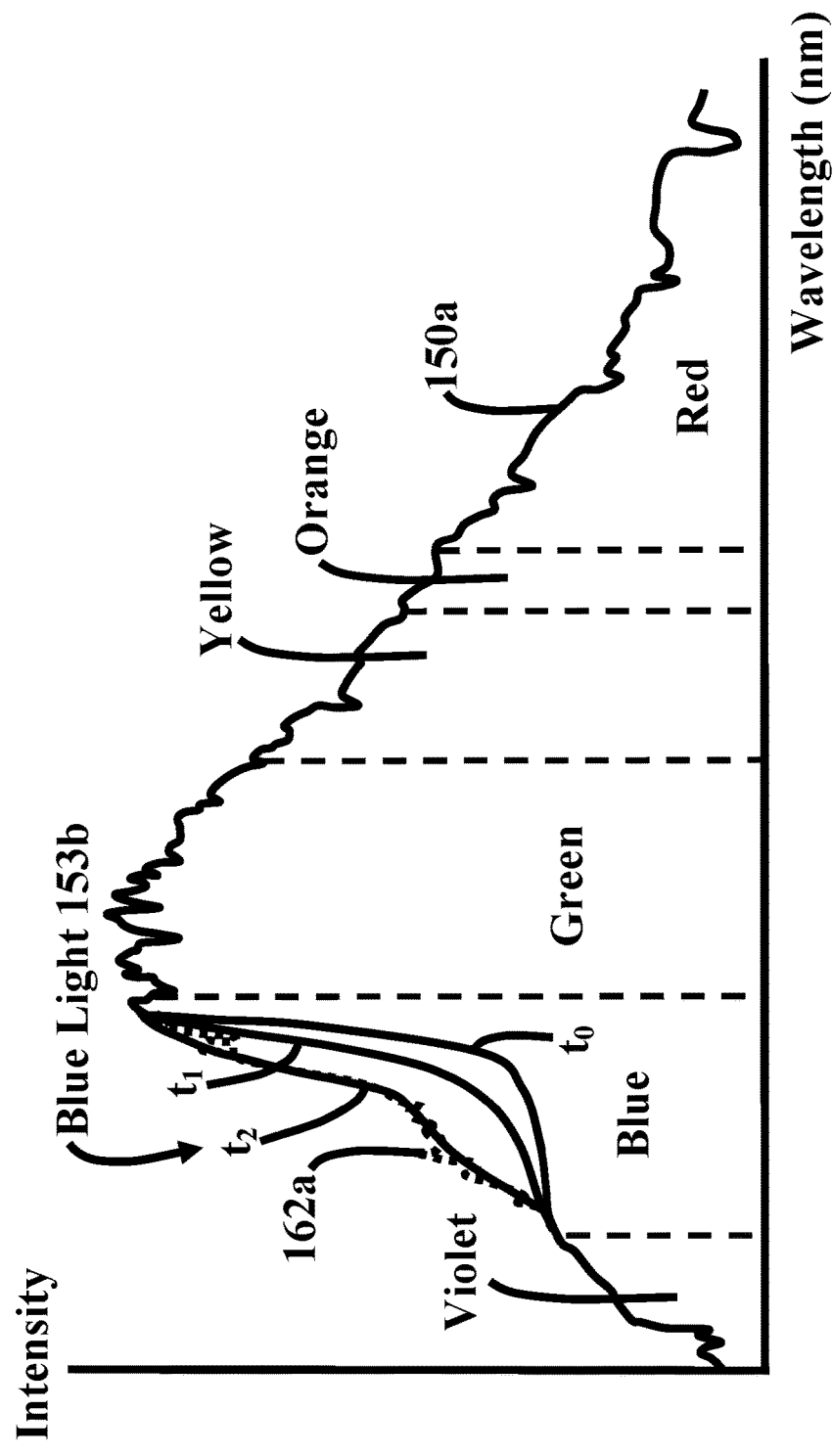
FIG. 14 is a graph of the light spectrum and a desired light spectrum, wherein the light spectrum and desired light spectrum are proximate to each other in the violet, green, yellow, orange, and red spectrums of light.

FIG. 14 is a graph 162 of the light spectrum 150a and a desired light spectrum 162a. In this embodiment, the light spectrum 150a and desired light spectrum 162a are proximate to each other in the violet, green, yellow, orange, and red spectrums of light. The light spectrum 150a is driven towards the desired light spectrum 162a in the blue color of light in response to the blue light 153b being provided. The light spectrum 150a is driven towards the desired light spectrum 162a in the blue color of light in response to increasing the intensity of the blue light 153b. In this embodiment, a first difference between the light spectrum 150a and the desired light spectrum 162a is decreased in response to increasing the intensity of the blue light 153b from the time t0 to the time t1. A second difference between the light spectrum 150a and the desired light spectrum 162a is decreased in response to increasing the intensity of the blue light 153b from the time t1 to the time t2.

In this embodiment, the light spectrum 150a is driven away from the desired light spectrum 162a in the blue color of light in response to decreasing the intensity of the blue light 153b. In this embodiment, the first difference between the light spectrum 150a and the desired light spectrum 162a is increased in response to decreasing the intensity of the blue light 153b. The second difference between the light spectrum 150a and the desired light spectrum 162a is increased in response to decreasing the intensity of the blue light 153b.

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the blue portion of light is adjusted to adjust the light spectrum 150a.

Figure 15:
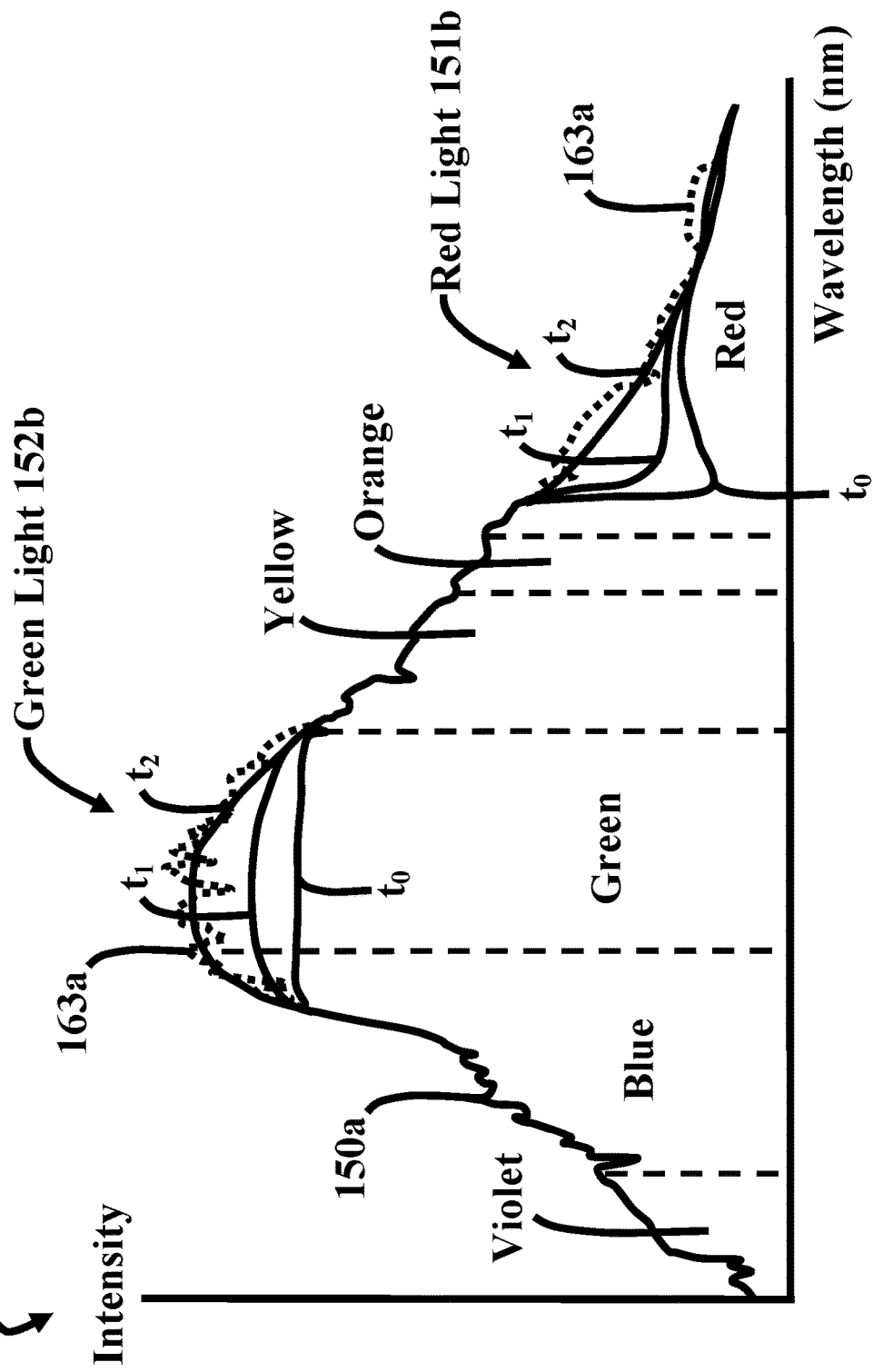
FIG. 15 is a graph of the light spectrum and a desired light spectrum, wherein the light spectrum and desired light spectrum are proximate to each other in the violet, blue, yellow, and orange, spectrums of light.

FIG. 15 is a graph 163 of the light spectrum 150a and a desired light spectrum 163a. In this embodiment, the light spectrum 150a and desired light spectrum 160a are proximate to each other in the violet, blue, yellow, and orange spectrums of light. The light spectrum 150a is driven towards the desired light spectrum 163a in the red color of light in response to the red light 151b being provided. The light spectrum 150a is driven towards the desired light spectrum 163a in the red color of light in response to increasing the intensity of the red light 151b. In this embodiment, a first difference between the light spectrum 150a and the desired light spectrum 163a is decreased in response to increasing the intensity of the red light 151b from a time t0 to a time t1. A second difference between the light spectrum 150a and the desired light spectrum 163a is decreased in response to increasing the intensity of the red light 151b from the time t1 to a time t2. It should be noted that the time t1 is greater than the time to, and the time t2 is greater than the time t1. Further, the time t1 is less than the time t2, and the time t0 is less than the time t1.

In this embodiment, the light spectrum 150a is driven away from the desired light spectrum 163a in the red color of light in response to decreasing the intensity of the red light 151b. In this embodiment, the first difference between the light spectrum 150a and the desired light spectrum 163a is increased in response to decreasing the intensity of the red light 151b. The second difference between the light spectrum 150a and the desired light spectrum 163a is increased in response to decreasing the intensity of the red light 151b.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 21111a of the LED 129a (FIG. 1b). The red light 151b can also be provided by one or more of the LEDs of the LED arrays 128 and 129, such as the red portions 110a and 111a.

In this embodiment, the light spectrum 150a and desired light spectrum 163a are proximate to each other in the violet, blue, yellow, orange, and red spectrums of light. The light spectrum 150a is driven towards the desired light spectrum 163a in the green color of light in response to the green light 152b being provided. The light spectrum 150a is driven towards the desired light spectrum 163a in the green color of light in response to increasing the intensity of the green light 152b. In this embodiment, a first difference between the light spectrum 150a and the desired light spectrum 163a is decreased in response to increasing the intensity of the green light 152b from the time t0 to the time t1. A second difference between the light spectrum 150a and the desired light spectrum 163a is decreased in response to increasing the intensity of the green light 152b from the time t1 to the time t2.

In this embodiment, the light spectrum 150a is driven away from the desired light spectrum 163a in the green color of light in response to decreasing the intensity of the green light 152*b*. In this embodiment, the first difference between the light spectrum 150*a* and the desired light spectrum 163*a* is increased in response to decreasing the intensity of the green light 152*b*. The second difference between the light spectrum 150*a* and the desired light spectrum 163*a* is increased in response to decreasing the intensity of the green light 152*b*.

As mentioned above, the green light 152*b* can be provided in many different ways. In some situations, the green light 152*b* is provided by one or more of the LEDs of the LED array 128, such as the green portion 110*b* of the LED 128*a* (FIG. 1*c*). In another situation, the green light 152*b* is provided by one or more of the LEDs of the LED array 129, such as the green portion 111*b* of the LED 129*a* (FIG. 1*b*). The green light 152*b* can also be provided by one or more of the LEDs of the LED arrays 128 and 129, such as the green portions 110*b* and 111*b*. In this way, the green and red portions of light are adjusted to adjust the light spectrum 150*a*. Further, the green and red portions of light are adjusted to drive the light spectrum 150*a* to the desired light spectrum 163*a*.

Figure 16:
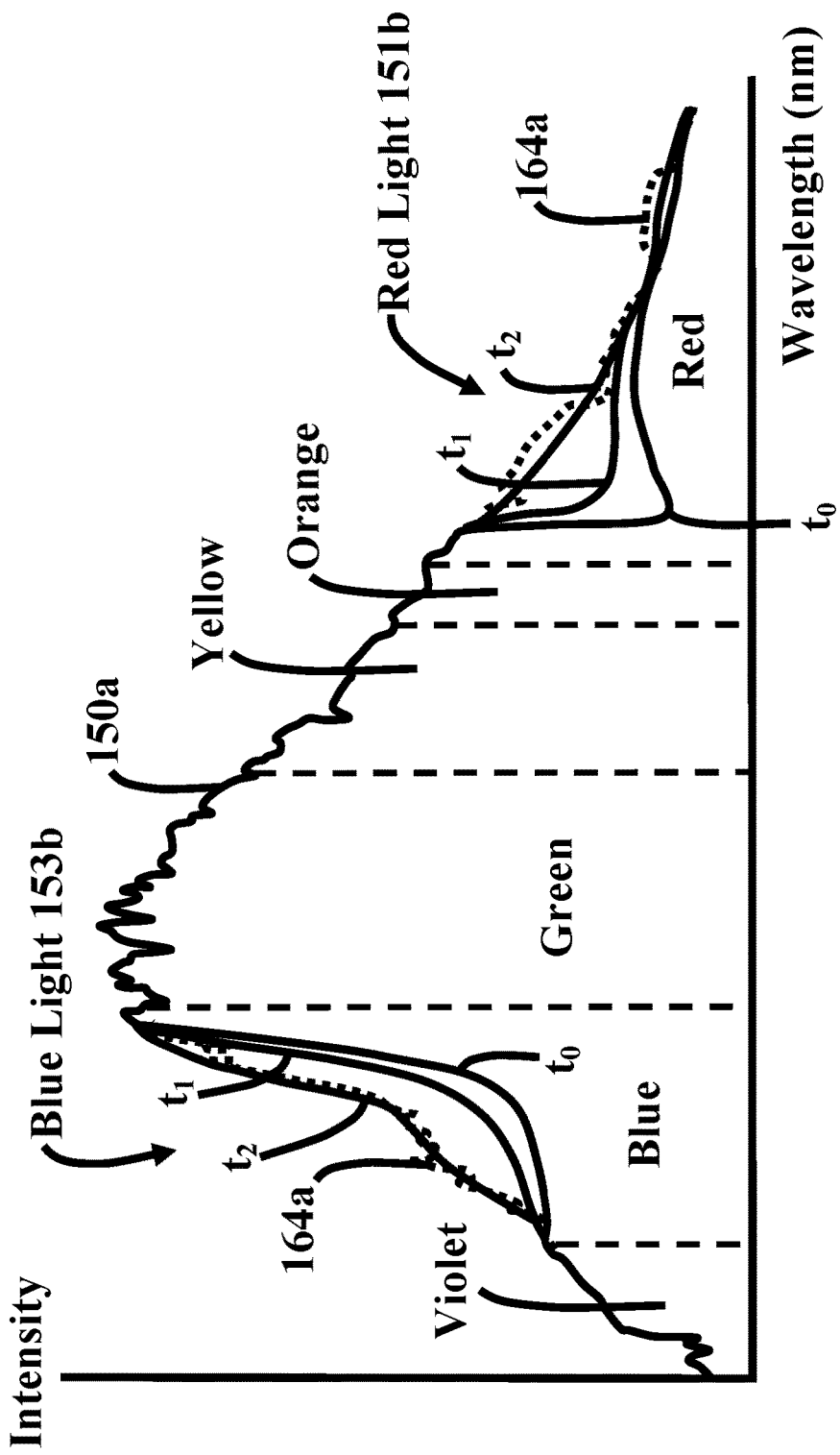
FIG. 16 is a graph of the light spectrum and a desired light spectrum, wherein the light spectrum and desired light spectrum are proximate to each other in the violet, green, yellow, and orange spectrums of light.

FIG. 16 is a graph 164 of the light spectrum 150*a* and a desired light spectrum 164*a*. In this embodiment, the light spectrum 150*a* and desired light spectrum 160*a* are proximate to each other in the violet, green, yellow, and orange spectrums of light. The light spectrum 150*a* is driven towards the desired light spectrum 164*a* in the red color of light in response to the red light 151*b* being provided. The light spectrum 150*a* is driven towards the desired light spectrum 164*a* in the red color of light in response to increasing the intensity of the red light 151*b*. In this embodiment, a first difference between the light spectrum 150*a* and the desired light spectrum 164*a* is decreased in response to increasing the intensity of the red light 151*b* from a time t0 to a time t1. A second difference between the light spectrum 150*a* and the desired light spectrum 164*a* is decreased in response to increasing the intensity of the red light 151*b* from the time t1 to a time t2. It should be noted that the time t1 is greater than the time t0, and the time t2 is greater than the time t1. Further, the time t1 is less than the time t2, and the time t0 is less than the time t1.

In this embodiment, the light spectrum 150*a* is driven away from the desired light spectrum 164*a* in the red color of light in response to decreasing the intensity of the red light 151*b*. In this embodiment, the first difference between the light spectrum 150*a* and the desired light spectrum 164*a* is increased in response to decreasing the intensity of the red light 151*b*. The second difference between the light spectrum 150*a* and the desired light spectrum 164*a* is increased in response to decreasing the intensity of the red light 151*b*.

As mentioned above, the red light 151*b* can be provided in many different ways. In some situations, the red light 151*b* is provided by one or more of the LEDs of the LED array 128, such as the red portion 110*a* of the LED 128*a* (FIG. 1*c*). In another situation, the red light 151*b* is provided by one or more of the LEDs of the LED array 129, such as the red portion 111*a* of the LED 129*a* (FIG. 1*b*). The red light 151*b* can also be provided by one or more of the LEDs of the LED arrays 128 and 129, such as the red portions 110*a* and 111*a*.

In this embodiment, the light spectrum 150*a* and desired light spectrum 164*a* are proximate to each other in the violet, green, yellow, orange, and red spectrums of light. The light spectrum 150*a* is driven towards the desired light spectrum 164*a* in the blue color of light in response to the blue light 153*b* being provided. The light spectrum 150*a* is driven towards the desired light spectrum 164*a* in the blue color of light in response to increasing the intensity of the blue light 153*b*. In this embodiment, a first difference between the light spectrum 150*a* and the desired light spectrum 164*a* is decreased in response to increasing the intensity of the blue light 153*b* from the time t0 to the time t1. A second difference between the light spectrum 150*a* and the desired light spectrum 164*a* is decreased in response to increasing the intensity of the blue light 153*b* from the time t1 to the time t2.

In this embodiment, the light spectrum 150*a* is driven away from the desired light spectrum 164*a* in the blue color of light in response to decreasing the intensity of the blue light 153*b*. In this embodiment, the first difference between the light spectrum 150*a* and the desired light spectrum 164*a* is increased in response to decreasing the intensity of the blue light 153*b*. The second difference between the light spectrum 150*a* and the desired light spectrum 164*a* is increased in response to decreasing the intensity of the blue light 153*b*.

As mentioned above, the blue light 153*b* can be provided in many different ways. In some situations, the blue light 153*b* is provided by one or more of the LEDs of the LED array 128, such as the blue portion 110*c* of the LED 128*a* (FIG. 1*c*). In another situation, the blue light 153*b* is provided by one or more of the LEDs of the LED array 129, such as the blue portion 111*c* of the LED 129*a* (FIG. 1*b*). The blue light 153*b* can also be provided by one or more of the LEDs of the LED arrays 128 and 129, such as the blue portions 110*c* and 111*c*. In this way, the blue and red portions of light are adjusted to adjust the light spectrum 150*a*. Further, the blue and red portions of light are adjusted to drive the light spectrum 150*a* to the desired light spectrum 164*a*.

Figure 17:
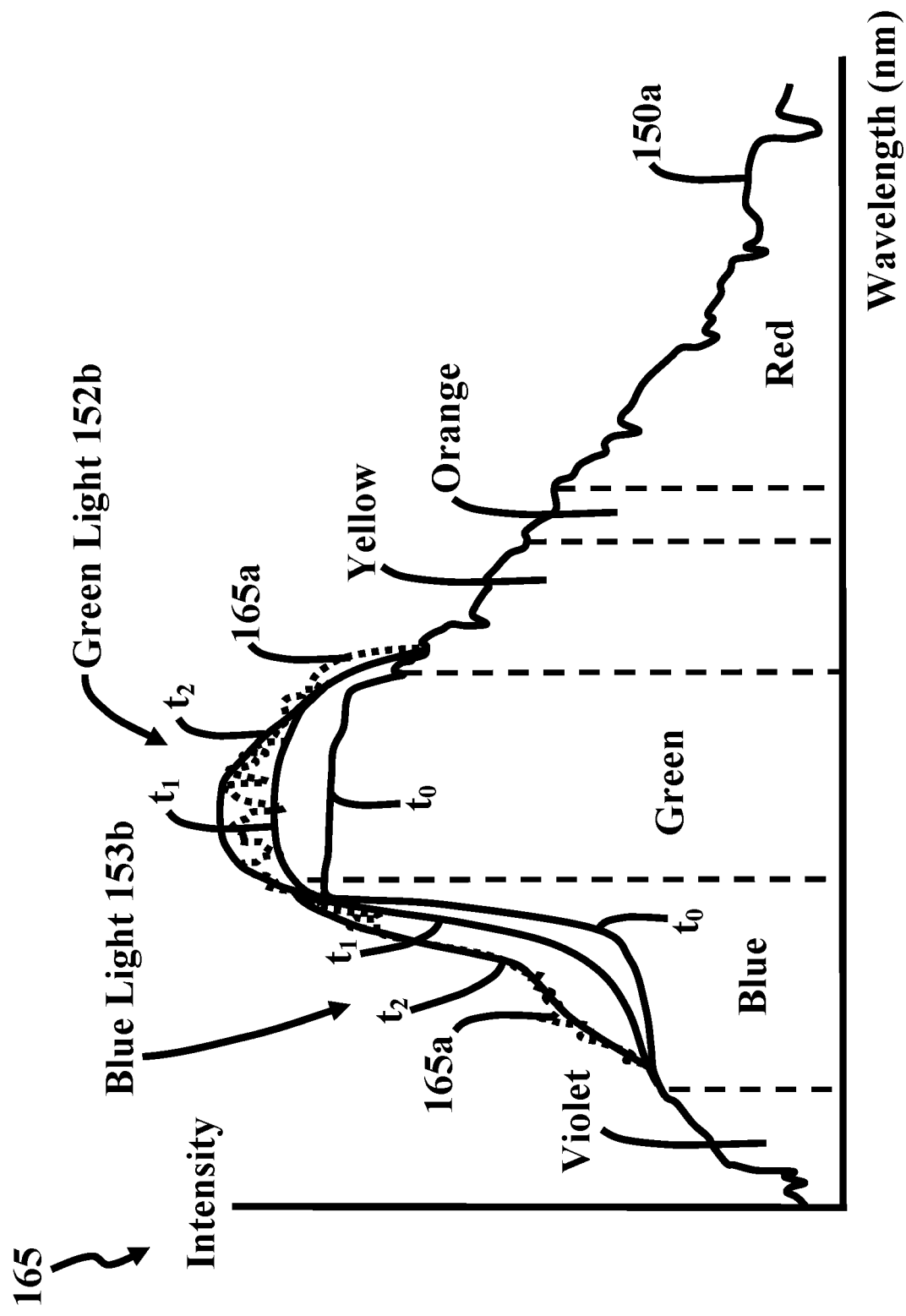
FIG. 17 is a graph of the light spectrum and a desired light spectrum, wherein the light spectrum and desired light spectrum are proximate to each other in the violet, yellow, orange, and red spectrums of light.

FIG. 17 is a graph 165 of the light spectrum 150*a* and a desired light spectrum 165*a*. In this embodiment, the light spectrum 150*a* and desired light spectrum 165*a* are proximate to each other in the violet, yellow, orange, and red spectrums of light. The light spectrum 150*a* is driven towards the desired light spectrum 165*a* in the green color of light in response to the green light 152*b* being provided. The light spectrum 150*a* is driven towards the desired light spectrum 165*a* in the green color of light in response to increasing the intensity of the green light 152*b*. In this embodiment, a first difference between the light spectrum 150*a* and the desired light spectrum 165*a* is decreased in response to increasing the intensity of the green light 152*b* from the time t0 to the time t1. A second difference between the light spectrum 150*a* and the desired light spectrum 165*a* is decreased in response to increasing the intensity of the green light 152*b* from the time t1 to the time t2.

In this embodiment, the light spectrum 150*a* is driven away from the desired light spectrum 165*a* in the green color of light in response to decreasing the intensity of the green light 152*b*. In this embodiment, the first difference between the light spectrum 150*a* and the desired light spectrum 165*a* is increased in response to decreasing the intensity of the green light 152*b*. The second difference between the light spectrum 150*a* and the desired light spectrum 165*a* is increased in response to decreasing the intensity of the green light 152*b*.

As mentioned above, the green light 152*b* can be provided in many different ways. In some situations, the green light 152*b* is provided by one or more of the LEDs of the LED array 128, such as the green portion 110*b* of the LED 128*a* (FIG. 1*c*). In another situation, the green light 152*b* is provided by one or more of the LEDs of the LED array 129, such as the green portion 111*b* of the LED 129*a* (FIG. 1*b*).

The green light 152b can also be provided by one or more of the LEDs of the LED arrays 128 and 129, such as the green portions 110b and 111b. In this way, the green portion of light is adjusted to adjust the light spectrum 150a.

In this embodiment, the light spectrum 150a and desired light spectrum 165a are proximate to each other in the violet, green, yellow, orange, and red spectrums of light. The light spectrum 150a is driven towards the desired light spectrum 165a in the blue color of light in response to the blue light 153b being provided. The light spectrum 150a is driven towards the desired light spectrum 165a in the blue color of light in response to increasing the intensity of the blue light 153b. In this embodiment, a first difference between the light spectrum 150a and the desired light spectrum 165a is decreased in response to increasing the intensity of the blue light 153b from the time t0 to the time t1. A second difference between the light spectrum 150a and the desired light spectrum 165a is decreased in response to increasing the intensity of the blue light 153b from the time t1 to the time t2.

In this embodiment, the light spectrum 150a is driven away from the desired light spectrum 165a in the blue color of light in response to decreasing the intensity of the blue light 153b. In this embodiment, the first difference between the light spectrum 150a and the desired light spectrum 165a is increased in response to decreasing the intensity of the blue light 153b. The second difference between the light spectrum 150a and the desired light spectrum 165a is increased in response to decreasing the intensity of the blue light 153b.

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the blue and green portions of light are adjusted to adjust the light spectrum 150a. Further, the blue and green portions of light are adjusted to drive the light spectrum 150a to the desired light spectrum 165a.

Figure 18:
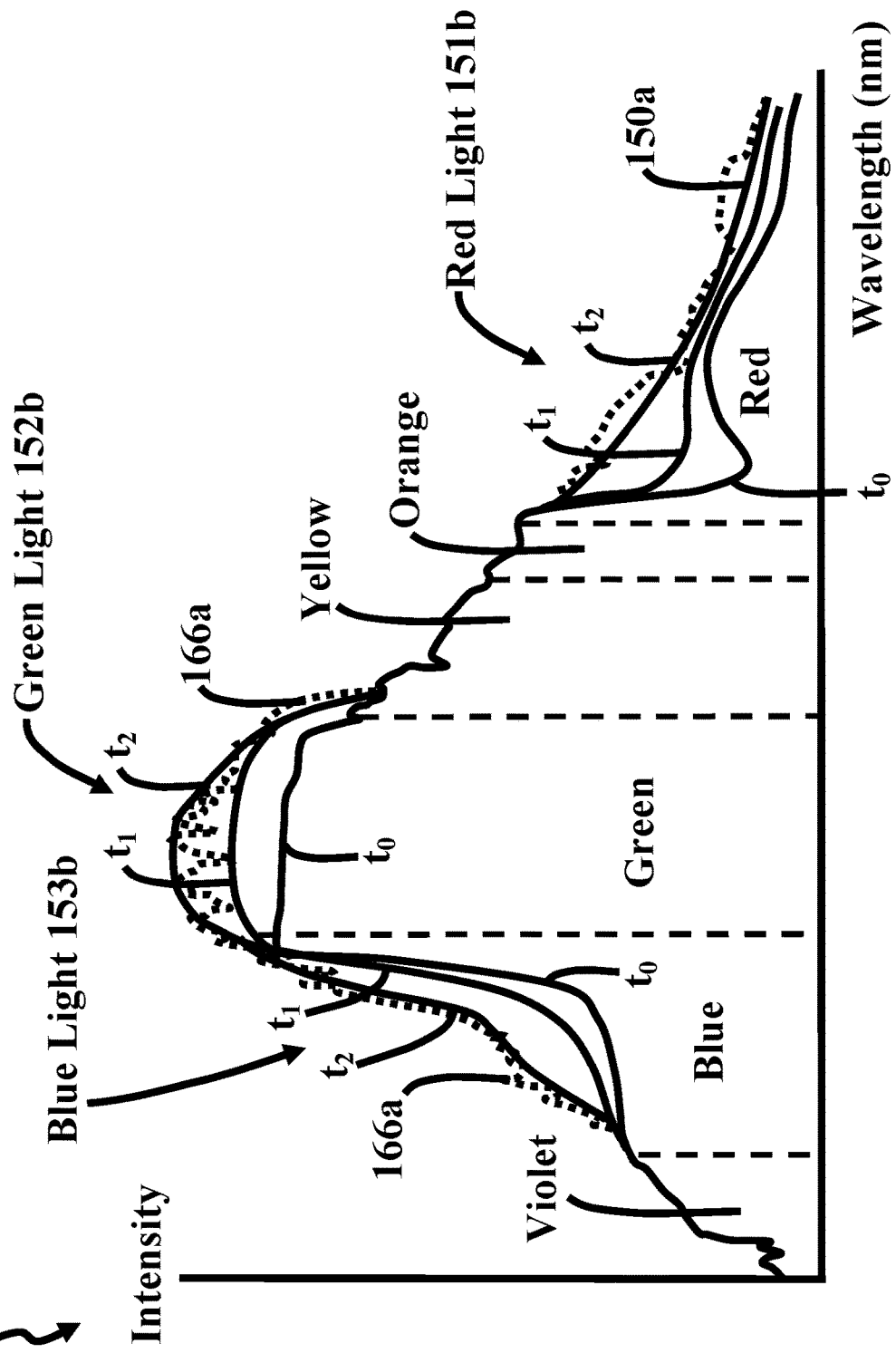
FIG. 18 is a graph of the light spectrum and a desired light spectrum, wherein the light spectrum and desired light spectrum are proximate to each other in the violet, yellow, and orange spectrums of light.

FIG. 18 is a graph 166 of the light spectrum 150a and a desired light spectrum 166a. In this embodiment, the light spectrum 150a and desired light spectrum 160a are proximate to each other in the violet, blue, yellow, and orange spectrums of light. The light spectrum 150a is driven towards the desired light spectrum 166a in the red color of light in response to the red light 151b being provided. The light spectrum 150a is driven towards the desired light spectrum 166a in the red color of light in response to increasing the intensity of the red light 151b. In this embodiment, a first difference between the light spectrum 150a and the desired light spectrum 166a is decreased in response to increasing the intensity of the red light 151b from a time t0 to a time t1. A second difference between the light spectrum 150a and the desired light spectrum 166a is decreased in response to increasing the intensity of the red light 151b from the time t1 to a time t2. It should be noted that the time t1 is greater than the time to, and the time t2 is greater than the time t1. Further, the time t1 is less than the time t2, and the time t0 is less than the time t1.

In this embodiment, the light spectrum 150a is driven away from the desired light spectrum 166a in the red color of light in response to decreasing the intensity of the red light 151b. In this embodiment, the first difference between the light spectrum 150a and the desired light spectrum 166a is increased in response to decreasing the intensity of the red light 151b. The second difference between the light spectrum 150a and the desired light spectrum 166a is increased in response to decreasing the intensity of the red light 151b.

As mentioned above, the red light 151b can be provided in many different ways. In some situations, the red light 151b is provided by one or more of the LEDs of the LED array 128, such as the red portion 110a of the LED 128a (FIG. 1c). In another situation, the red light 151b is provided by one or more of the LEDs of the LED array 129, such as the red portion 111a of the LED 129a (FIG. 1b). The red light 151b can also be provided by one or more of the LEDs of the LED arrays 128 and 129, such as the red portions 110a and 111a.

In this embodiment, the light spectrum 150a and desired light spectrum 166a are proximate to each other in the violet, blue, yellow, orange, and red spectrums of light. The light spectrum 150a is driven towards the desired light spectrum 166a in the green color of light in response to the green light 152b being provided. The light spectrum 150a is driven towards the desired light spectrum 166a in the green color of light in response to increasing the intensity of the green light 152b. In this embodiment, a first difference between the light spectrum 150a and the desired light spectrum 166a is decreased in response to increasing the intensity of the green light 152b from the time t0 to the time t1. A second difference between the light spectrum 150a and the desired light spectrum 166a is decreased in response to increasing the intensity of the green light 152b from the time t1 to the time t2.

In this embodiment, the light spectrum 150a is driven away from the desired light spectrum 166a in the green color of light in response to decreasing the intensity of the green light 152b. In this embodiment, the first difference between the light spectrum 150a and the desired light spectrum 166a is increased in response to decreasing the intensity of the green light 152b. The second difference between the light spectrum 150a and the desired light spectrum 166a is increased in response to decreasing the intensity of the green light 152b.

As mentioned above, the green light 152b can be provided in many different ways. In some situations, the green light 152b is provided by one or more of the LEDs of the LED array 128, such as the green portion 110b of the LED 128a (FIG. 1c). In another situation, the green light 152b is provided by one or more of the LEDs of the LED array 129, such as the green portion 111b of the LED 129a (FIG. 1b). The green light 152b can also be provided by one or more of the LEDs of the LED arrays 128 and 129, such as the green portions 110b and 111b.

In this embodiment, the light spectrum 150a and desired light spectrum 166a are proximate to each other in the violet, green, yellow, orange, and red spectrums of light. The light spectrum 150a is driven towards the desired light spectrum 166a in the blue color of light in response to the blue light 153b being provided. The light spectrum 150a is driven towards the desired light spectrum 166a in the blue color of light in response to increasing the intensity of the blue light 153b. In this embodiment, a first difference between the light spectrum 150a and the desired light spectrum 166a is decreased in response to increasing the intensity of the blue light 153b from the time t0 to the time t1. A second difference between the light spectrum 150a and the desired light spectrum 166a is decreased in response to increasing the intensity of the blue light 153b from the time t1 to the time t2.

In this embodiment, the light spectrum 150a is driven away from the desired light spectrum 166a in the blue color of light in response to decreasing the intensity of the blue light 153b. In this embodiment, the first difference between the light spectrum 150a and the desired light spectrum 166a is increased in response to decreasing the intensity of the blue light 153b. The second difference between the light spectrum 150a and the desired light spectrum 166a is increased in response to decreasing the intensity of the blue light 153b.

As mentioned above, the blue light 153b can be provided in many different ways. In some situations, the blue light 153b is provided by one or more of the LEDs of the LED array 128, such as the blue portion 110c of the LED 128a (FIG. 1c). In another situation, the blue light 153b is provided by one or more of the LEDs of the LED array 129, such as the blue portion 111c of the LED 129a (FIG. 1b). The blue light 153b can also be provided by one or more of the LEDs of the LED arrays 128 and 129, such as the blue portions 110c and 111c. In this way, the blue, green, and red portions of light are adjusted to adjust the light spectrum 150a. Further, the blue, green, and red portions of light are adjusted to drive the light spectrum 150a to the desired light spectrum 166a.

Figure 19:
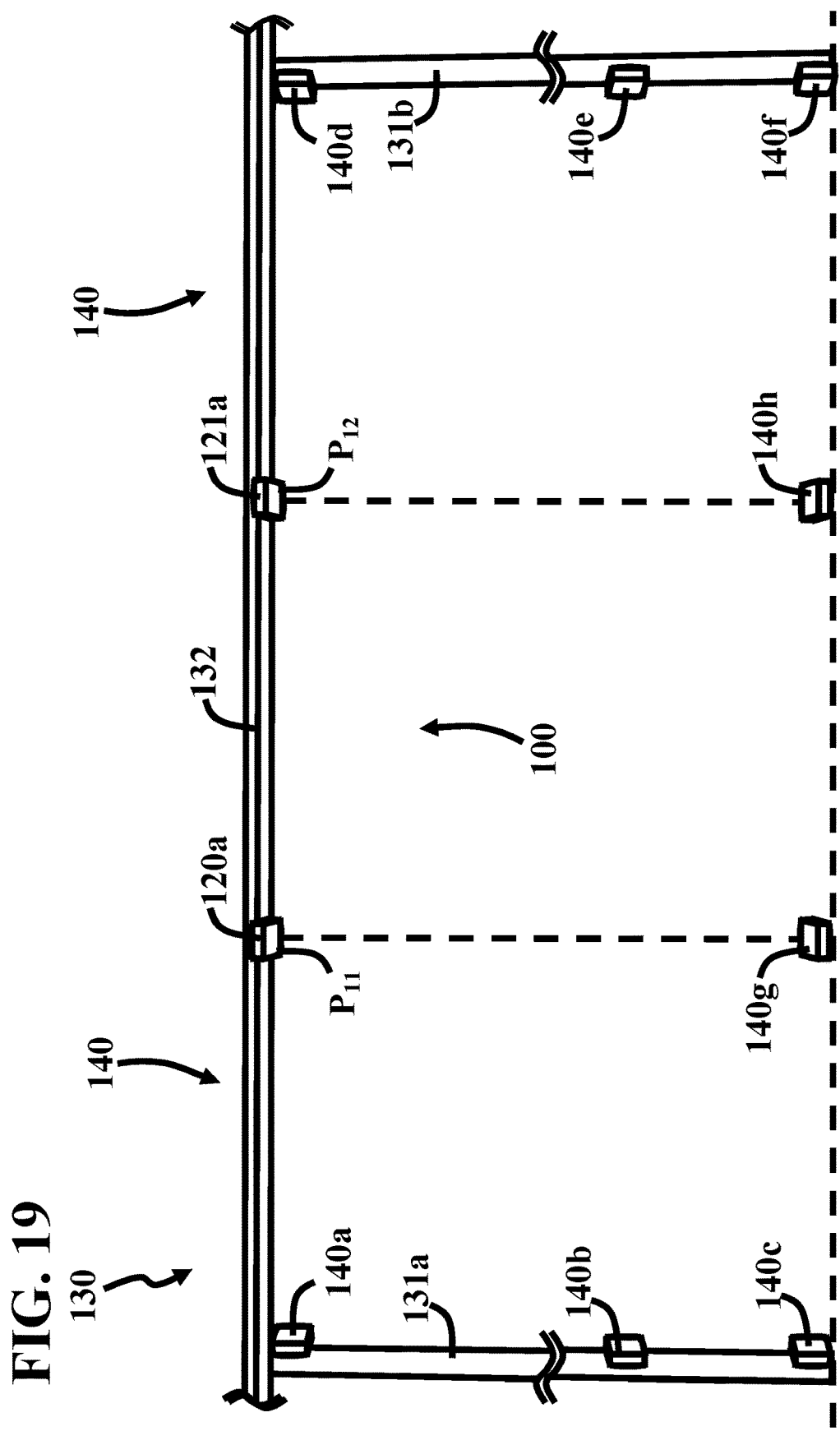
FIG. 19 is a side view of a system, which includes the grow light array and a sensor array of FIG. 3.

FIG. 19 is a side view of a system 130, which includes the grow light array 100 (FIG. 3) and a sensor array 140. It should be noted that the sensor array 140 senses light provided by the grow light array 100, as well as light provided by an ambient light source. Sensor array 140 can also sense micro-mol quantity and/or color. Sensor array 140 can also be configured to detect temperature, humidity, and other parameters. The ambient light source can be of many different types of light sources, such as the sun. Hence, the ambient light can include sunlight, such as the sunlight that corresponds to the spectrums 150a and 150b (FIG. 4).

In this embodiment, the grow light array 100 includes grow lights 120a and 121a, wherein the grow lights 120a and 121a are positioned at positions $P_{11}$ and $P_{12}$ (FIG. 3), respectively. As discussed in more detail with FIG. 3, the grow light array 100 generally includes a plurality of grow lights. The grow light array 100 includes two grow lights in system 130 for illustrative purposes. In this embodiment, the sensor array 140 includes sensors 140a, 140b, 140c, 140d, 140e, 140f, 140g, and 140h.

The system 130 includes one or more support beams. In this embodiment, the system 130 includes opposed support beams 131a and 131b. The system 130 includes one or more cross beams. In this embodiment, the system 130 includes a cross beam 132, wherein the cross beam 132 is carried by the opposed support beams 131a and 131b.

The sensors of the sensor array 140 can be positioned at many different locations. In this embodiment, the sensors 140a, 140b, and 140c are carried by the support beam 131a. In particular, the sensor 140a is carried by the support beam 131a and positioned proximate to the cross beam 132. The sensor 140b is positioned between the sensors 140a and 140c, and the sensor 140c is positioned away from the sensor 140a.

In this embodiment, the sensors 140d, 140e, and 140f are carried by the support beam 131b. In particular, the sensor 140d is carried by the support beam 131b and positioned proximate to the cross beam 132. The sensor 140e is positioned between the sensors 140d and 140f, and the sensor 140f is positioned away from the sensor 140d.

In this embodiment, the sensors 140g and 140f are positioned between the support beams 131a and 131b and away from the cross beam 132. Further, the sensor 140g is positioned between the sensors 140c and 140h, and the sensor 140h is positioned between the sensors 140f and 140g. Hence, in system 130, some of the sensors are carried by a support beam and other of the sensors are not carried by a support beam.

In this embodiment, the sensor 140g faces the grow light 120a, and the sensor 140h faces the grow light 121a. In particular, the sensor 140g faces the surface 125b (FIG. 1a) of the grow light 120a, and the sensor 140h faces the surface 125b (FIG. 1a) of the grow light 121a.

Figure 20:
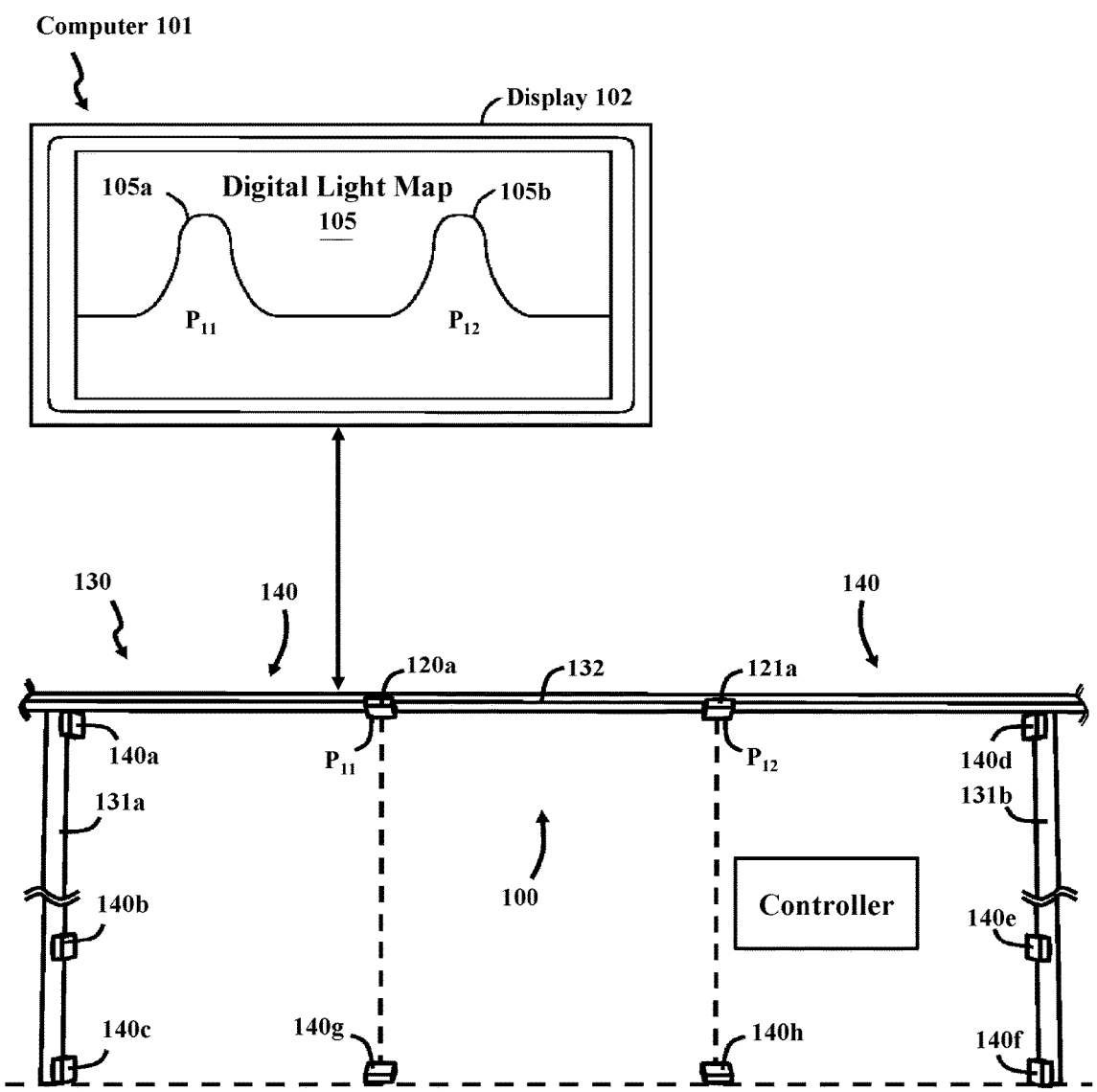
FIG. 20 is a side view of a computer, which includes a display, wherein the display displays a 1D digital light map corresponding to the system of FIG. 19.

FIG. 20 is a side view of a computer 101, which includes a display 102, wherein the display 102 displays a 1D digital light map 105. The computer 101 may have a transitory and/or non-transitory storage medium that includes volatile and non-volatile memory. While only one map is shown in FIG. 10, at least three separate visual maps could also be shown on display 102 whereby each map can pertain to separate locations, including systems that correspond to separate grow sites, whereby a system of each location can have any number of LEDs, LED arrays and/or sensors. The computer 101 can be of many different types, such as a desktop and laptop computer. The computer 101 can also be a mobile computing device such as a smart phone or tablet. In general, the computer 101 includes a processor which processes data, such as digital and/or analog data. It should be noted that a computer system generally includes the computer 101 and display 102, as well as one or more peripheral devices, such as a computer mouse and keyboard. Some computer systems, such as smart phones, have integrated displays that are touch screen. The keyboard of a smart phone is displayed by the screen.

The data can be provided to the computer in many different ways, such as through a wired and/or wireless communication link. In some embodiments, the computer 100 includes a transceiver (not shown), which allows data to be transmitted to and from the computer 100. The display 102 can be of many different types, such as a computer monitor, which displays information corresponding to the data. The computer 101 is repeatably moveable between ON and OFF conditions. The computer operates and does not operate in the ON and OFF conditions, respectively. In the ON condition, the computer 101 is capable of processing data. In the OFF condition, the computer 101 is not capable of processing data.

In this embodiment, the grow light array 100 and sensor array 140 of the system 130 (FIG. 19) are operatively coupled to the computer 101. The grow light array 100 and sensor array 140 of the system 130 can be operatively coupled to the computer 101 in many different ways, such as those disclosed in U.S. patent application Ser. No. 15/406,458.

In this embodiment, the 1D digital light map 105 corresponds to light sensed by the sensor array 140 (FIG. 19). The light can be provided in many different ways, such as by the grow light array 100 and/or by an ambient light source, such as the sun. The computer 101 of FIG. 20 can establish a target parameter or target parameter set and be operatively coupled with sensors of system 130, including sensor array 140. The target parameter can be established automatically based on the controller of system 130 analyzing sensory input from sensors (e.g., sensor array 140) or can be manually set by the end-user. Based on sensory input from sensors of system 130, an internal controller of system 130 can determine whether the target parameter or target parameter is satisfied and in turn adjust or control light output accordingly. The 1D digital light map 105 generally includes one or more light signals, wherein the light signals are adjustable. In this embodiment, the 1D digital light map 105 includes light signals 105a and 105b, which are positioned at positions corresponding to positions $P_{11}$ and $P_{12}$ respectively. The light signals 105a and 105b can be adjustable in many different ways. In certain embodiments, at least two parameters can be established by system 130, manually by the end-user and/or automatically by the system 13) and map 105 can also depict one or more differences between the at least two parameters to visualize live and/or accumulated discrepancies (e.g., DLI quantities, instantaneous quantifies, etc.). Map 105 can also depict location information.

In some embodiments, the light signals 105a and 105b are adjustable in response to adjusting the operation of the grow light array 100. For example, in some situations, the operation of the grow light array 100 is adjustable to adjust the spectrum of the light signals 105a and 105b. The spectrum of the light signals 105a and 105b can be adjusted in many different ways. For example, the light spectrum of the light signals 105a and 105b can be adjusted as discussed above with FIGS. 5-11 to drive the light spectrum to a desired light spectrum. In another example, the light spectrum of the light signals 105a and 105b can be adjusted as discussed above with FIGS. 12-18 to drive the light spectrum to a desired light spectrum.

Figure 21:
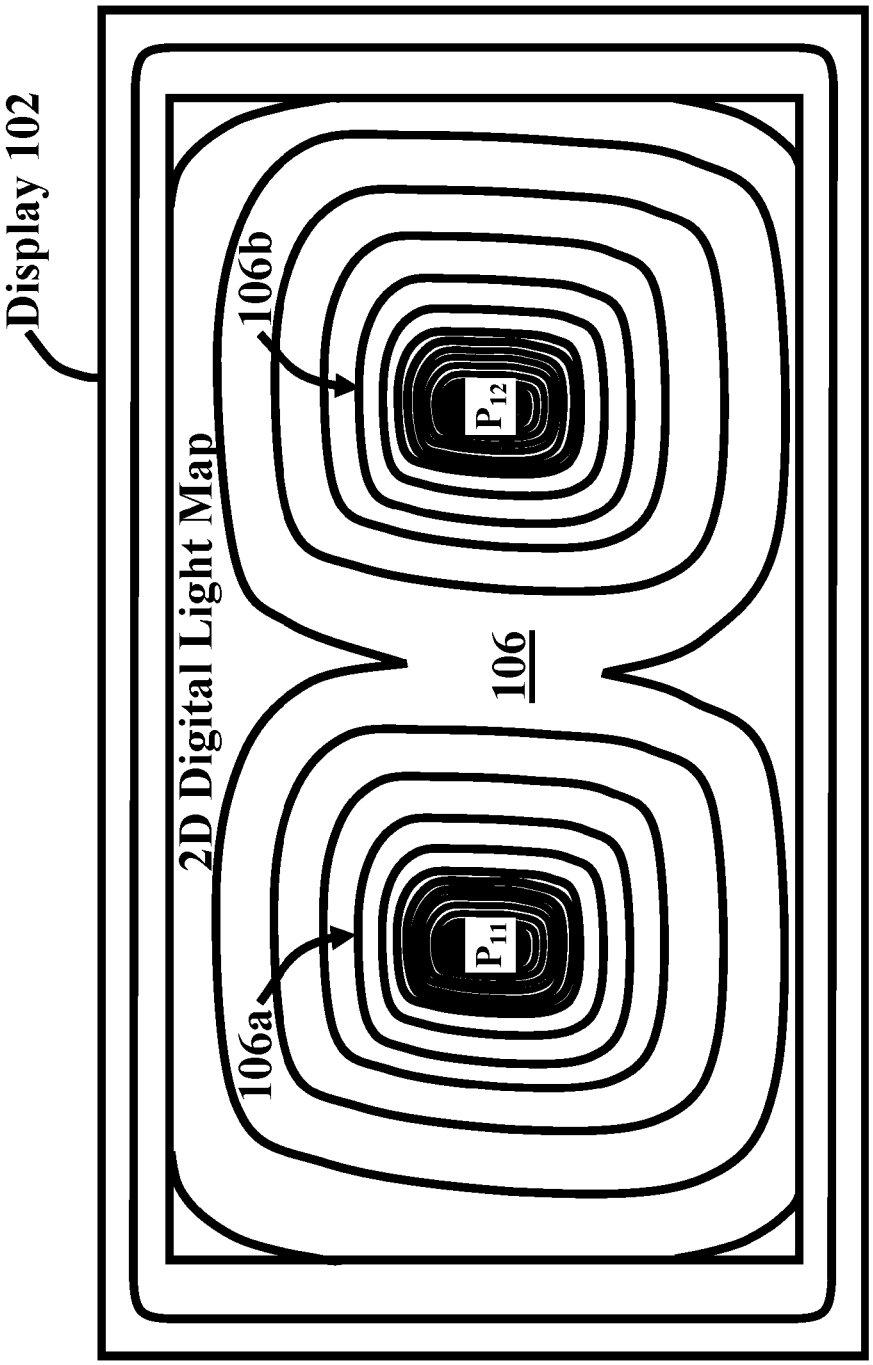
FIG. 21 is a side view of the computer, which includes the display, wherein the display displays a 2D digital light map corresponding to the system of FIG. 19.

In some embodiments, the light signals 105a and 105b are adjustable in response to adjusting the position of one or more grow lights of the grow light array 100. For example, the light signals 105a and 105b move towards each other in response to moving the grow lights 120a and 121a towards each other. Further, the light signals 105a and 105b move away from each other in response to moving the grow lights 120a and 121a away from each other. In this way, the grow lights 120a and 121a can be moved to provide a desired 1D digital light map FIG. 21 is a side view of the computer 101, which includes the display 102, wherein the display 102 displays a 2D digital light map 106. The computer 101 is discussed in more detail above with FIG. 20. In this embodiment, the 2D digital light map 106 corresponds to light sensed by the sensor array 140 (FIG. 19). The light can be provided in many different ways, such as by the grow light array 100 and/or by an ambient light source, such as the sun.

The 2D digital light map 106 generally includes one or more light signals, wherein the light signals are adjustable. In this embodiment, the 2D digital light map 106 includes light signals 106a and 106b, which are positioned at positions corresponding to positions $_{P11}$ $^{and}$ $_{P12}$, respectively. The light signals 106a and 106b can be adjustable in many different ways.

In some embodiments, the light signals 106a and 106b are adjustable in response to adjusting the operation of the grow light array 100. For example, in some situations, the operation of the grow light array 100 is adjustable to adjust the spectrum of the light signals 106a and 106b. The spectrum of the light signals 106a and 106b can be adjusted in many different ways. For example, the light spectrum of the light signals 106a and 106b can be adjusted as discussed above with FIGS. 5-11 to drive the light spectrum to a desired light spectrum. In another example, the light spectrum of the light signals 106a and 106b can be adjusted as discussed above with FIGS. 12-18 to drive the light spectrum to a desired light spectrum.

Figure 22:
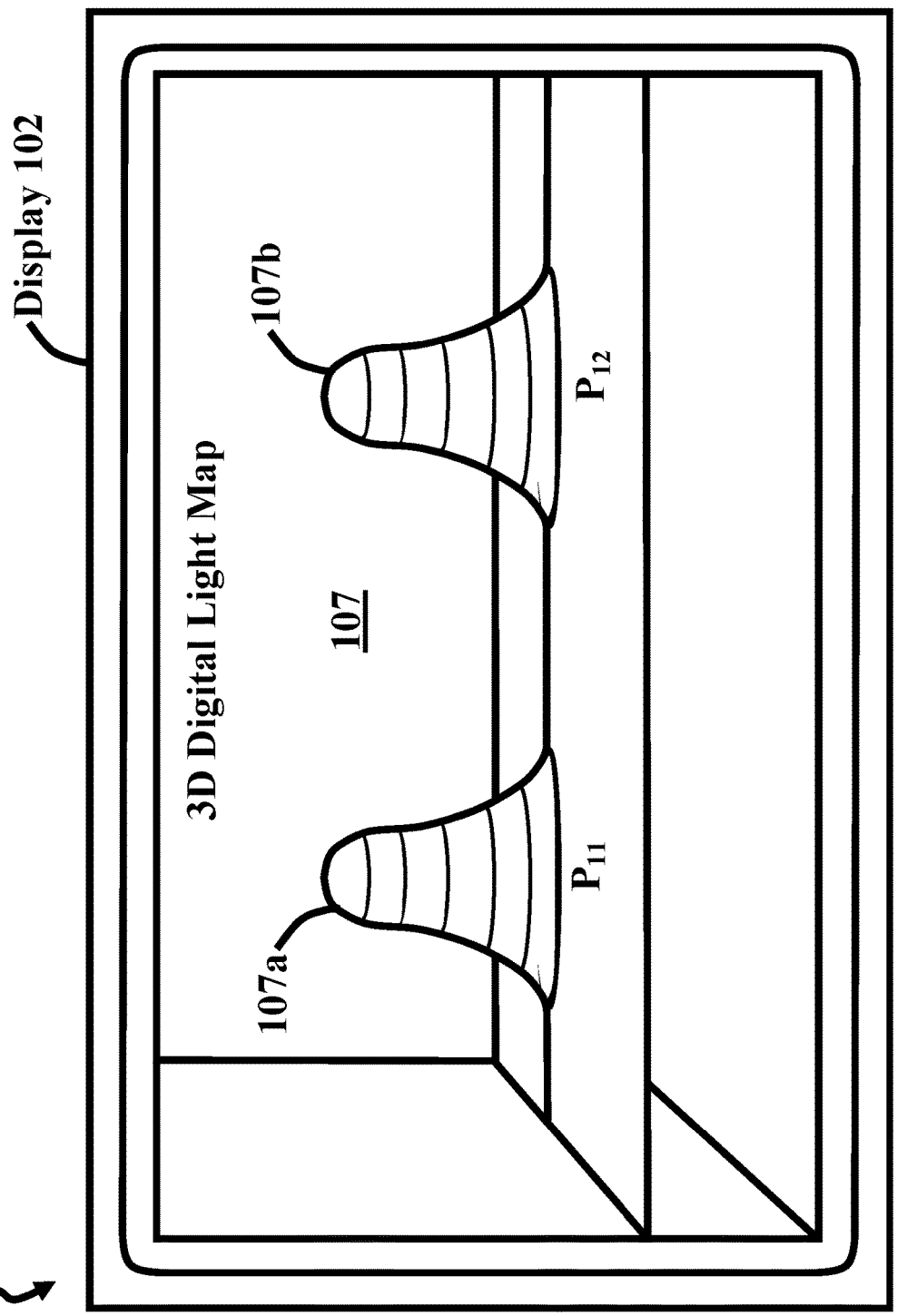
FIG. 22 is a side view of the computer, which includes the display, wherein the display displays a 3D digital light map corresponding to the system of FIG. 19.

In some embodiments, the light signals 106a and 106b are adjustable in response to adjusting the position of one or more grow lights of the grow light array 100. For example, the light signals 106a and 106b move towards each other in response to moving the grow lights 120a and 121a towards each other. Further, the light signals 106a and 106b move away from each other in response to moving the grow lights 120a and 121a away from each other. In this way, the grow lights 120a and 121a can be moved to provide a desired 2D digital light map FIG. 22 is a side view of the computer 101, which includes the display 102, wherein the display 102 displays a 3D digital light map 107. The computer 101 is discussed in more detail above with FIG. 20. In this embodiment, the 3D digital light map 107 corresponds to light sensed by the sensor array 140 (FIG. 19). The light can be provided in many different ways, such as by the grow light array 100 and/or by an ambient light source, such as the sun.

The 3D digital light map 107 generally includes one or more light signals, wherein the light signals are adjustable. In this embodiment, the 3D digital light map 107 includes light signals 107a and 107b, which are positioned at positions corresponding to positions $P_{11}$ and $P_{12}$ respectively. The light signals 107a and 107b can be adjustable in many different ways.

In some embodiments, the light signals 107a and 107b are adjustable in response to adjusting the operation of the grow light array 100. For example, in some situations, the operation of the grow light array 100 is adjustable to adjust the spectrum of the light signals 107a and 107b. The spectrum of the light signals 107a and 107b can be adjusted in many different ways. For example, the light spectrum of the light signals 107a and 107b can be adjusted as discussed above with FIGS. 5-11 to drive the light spectrum to a desired light spectrum. In another example, the light spectrum of the light signals 107a and 107b can be adjusted as discussed above with FIGS. 12-18 to drive the light spectrum to a desired light spectrum.

In some embodiments, the light signals 107a and 107b are adjustable in response to adjusting the position of one or more grow lights of the grow light array 100. For example, the light signals 107a and 107b move towards each other in response to moving the grow lights 120a and 121a towards each other. Further, the light signals 107a and 107b move away from each other in response to moving the grow lights 120a and 121a away from each other. In this way, the grow lights 120a and 121a can be moved to provide a desired 3D digital light map 107.

Figure 23:
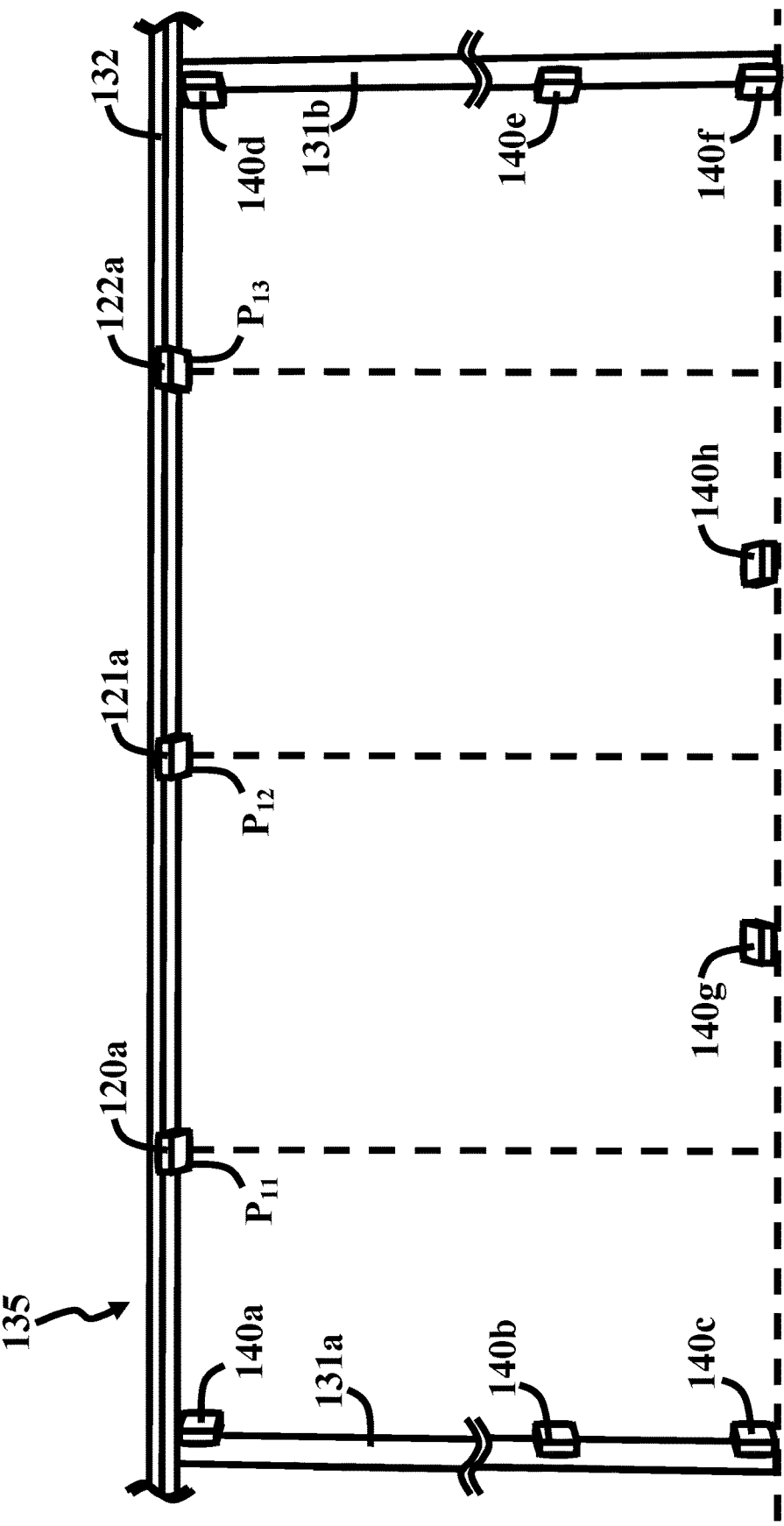
FIG. 23 is a side view of another system, which includes the grow light array and a sensor array of FIG. 3.

FIG. 23 is a side view of a system 135, which includes the grow light array 100 (FIG. 3) and sensor array 140. It should be noted that the sensor array 140 senses light provided by the grow light array 100, as well as light provided by an ambient light source. The ambient light source can be of many different types of light sources, such as the sun. Hence, the ambient light can include sunlight, such as the sunlight that corresponds to the spectrums 150a and 150b (FIG. 4).

In this embodiment, the grow light array 100 includes grow lights 120a, 121a, and 122a, wherein the grow lights 120a, 121a, and 122a are positioned at positions P11, P12, and P13 (FIG. 3), respectively. As discussed in more detail with FIG. 3, the grow light array 100 generally includes a plurality of grow lights. The grow light array 100 includes three grow lights in system 135 for illustrative purposes. In this embodiment, the sensor array 140 includes sensors 140a, 140b, 140c, 140d, 140e, 140f, 140g, and 140h.

The system 135 includes one or more support beams. In this embodiment, the system 135 includes opposed support beams 131a and 131b. The system 135 includes one or more cross beams. In this embodiment, the system 135 includes the cross beam 132, wherein the cross beam 132 is carried by the opposed support beams 131a and 131b.

The sensors of the sensor array 140 can be positioned at many different locations. In this embodiment, the sensors 140a, 140b, and 140c are carried by the support beam 131a. In particular, the sensor 140a is carried by the support beam 131a and positioned proximate to the cross beam 132. The sensor 140b is positioned between the sensors 140a and 140c, and the sensor 140c is positioned away from the sensor 140a.

In this embodiment, the sensors 140d, 140e, and 140f are carried by the support beam 131b. In particular, the sensor 140d is carried by the support beam 131b and positioned proximate to the cross beam 132. The sensor 140e is positioned between the sensors 140d and 140f, and the sensor 140f is positioned away from the sensor 140d.

In this embodiment, the sensors 140g and 140f are positioned between the support beams 131a and 131b and away from the cross beam 132. Further, the sensor 140g is positioned between the sensors 140c and 140h, and the sensor 140h is positioned between the sensors 140f and 140g. Hence, in system 135, some of the sensors are carried by a support beam and other of the sensors are not carried by a support beam. In this embodiment, the sensors 140g and 140h face the grow lights 120a, 121a, and 122a.

Figure 24:
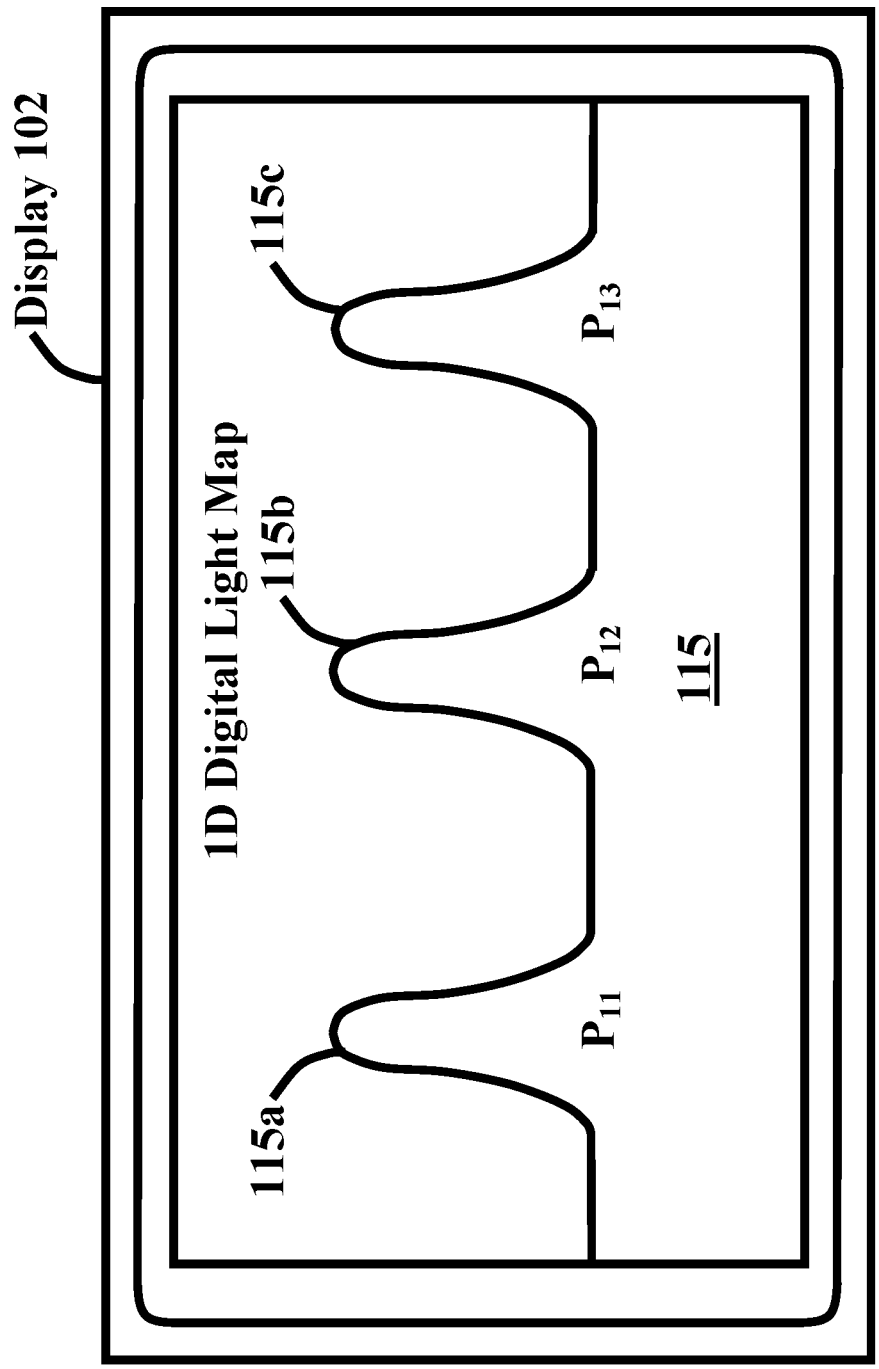
FIG. 24 is a side view of the computer, which includes the display, wherein the display displays a 1D digital light map corresponding to the system of FIG. 23.

FIG. 24 is a side view of the computer 101, which includes the display 102, wherein the display 102 displays a 1D digital light map 115. The computer 101 is discussed in more detail above with FIG. 20. In this embodiment, the grow light array 100 and sensor array 140 of the system 135 (FIG. 23) are operatively coupled to the computer 101. The grow light array 100 and sensor array 140 of the system 135 can be operatively coupled to the computer 101 in many different ways, such as those disclosed in U.S. patent application Ser. No. 15/406,458.

In this embodiment, the 1D digital light map 115 corresponds to light sensed by the sensor array 140 (FIG. 23). The light can be provided in many different ways, such as by the grow light array 100 and/or by an ambient light source, such as the sun.

The 1D digital light map 115 generally includes one or more light signals, wherein the light signals are adjustable. In this embodiment, the 1D digital light map 115 includes light signals 115a, 115b, and 115c, which are positioned at positions corresponding to positions $P_{11}$, $P_{12}$, and $P_{13}$, respectively. The light signals 115a, 115b, and 115c can be adjustable in many different ways.

In some embodiments, the light signals 115a, 115b, and 115c are adjustable in response to adjusting the operation of the grow light array 100. For example, in some situations, the operation of the grow light array 100 is adjustable to adjust the spectrum of the light signals 115a, 115b, and 115c. The spectrum of the light signals 115a, 115b, and 115c can be adjusted in many different ways. For example, the light spectrum of the light 115a, 115b, and 115c can be adjusted as discussed above with FIGS. 5-11 to drive the light spectrum to a desired light spectrum. In another example, the light spectrum of the light signals 115a, 115b, and 115c can be adjusted as discussed above with FIGS. 12-18 to drive the light spectrum to a desired light spectrum.

In some embodiments, the light signals 115a, 115b, and 115c are adjustable in response to adjusting the position of one or more grow lights of the grow light array 100. For example, the light signals 115a, 115b, and 115c move towards each other in response to moving the grow lights 120a, 121a, and 122a towards each other. Further, the light signals 115a, 115b, and 115c move away from each other in response to moving the grow lights 120a, 121a, and 122a away from each other. In this way, the grow lights 120a, 121a, and 122a can be moved to provide a desired 1D digital light map 115.

Figure 25:
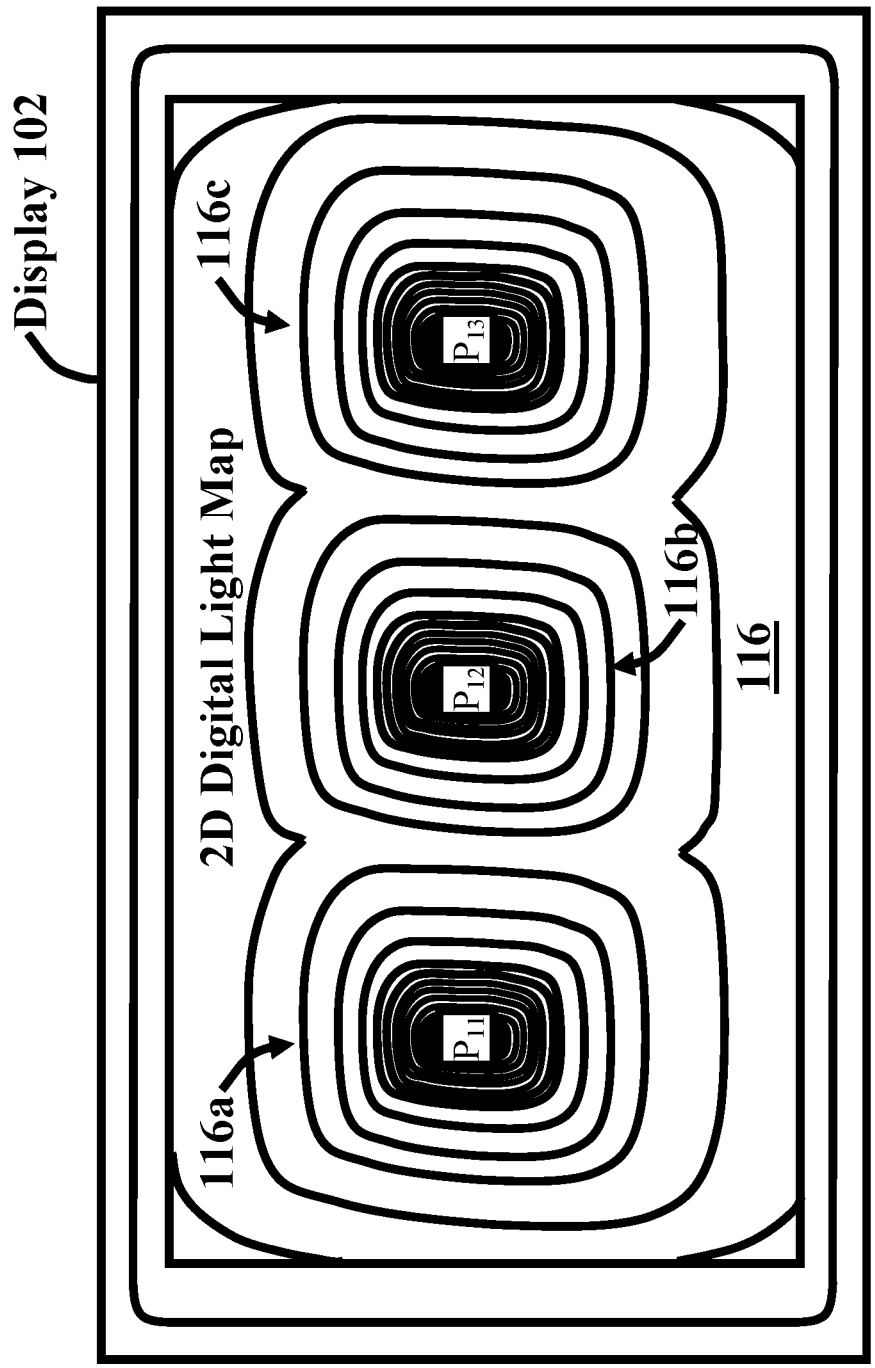
FIG. 25 is a side view of the computer, which includes the display, wherein the display displays a 2D digital light map corresponding to the system of FIG. 23.

FIG. 25 is a side view of the computer 101, which includes the display 102, wherein the display 102 displays a 2D digital light map 116. The computer 101 is discussed in more detail above with FIG. 20. In this embodiment, the 2D digital light map 116 corresponds to light sensed by the sensor array 140 (FIG. 19). The light can be provided in many different ways, such as by the grow light array 100 and/or by an ambient light source, such as the sun. It is understood that separate computers and/or separate systems 119 associated with other entirely separate grow sites can be exchanging information sensed from respective sensor arrays of each system 119 and be controlling or adjusting output from respective light systems separately or in tandem (e.g., a nested feedback loop).

The 2D digital light map 116 generally includes one or more light signals, wherein the light signals are adjustable. In this embodiment, the 2D digital light map 116 includes light signals 116a, 116b, and 116c, which are positioned at positions corresponding to positions $P_{11}$, $P_{12}$, and $P_{13}$, respectively. The light signals 116a, 116b, and 116c can be adjustable in many different ways.

In some embodiments, the light signals 116a, 116b, and 116c are adjustable in response to adjusting the operation of the grow light array 100. For example, in some situations, the operation of the grow light array 100 is adjustable to adjust the spectrum of the light signals 116a, 116b, and 116c. The spectrum of the light signals 116a, 116b, and 116c can be adjusted in many different ways. For example, the light spectrum of the light signals 116a, 116b, and 116c can be adjusted as discussed above with FIGS. 5-11 to drive the light spectrum to a desired light spectrum. In another example, the light spectrum of the light signals 116a, 116b, and 116c can be adjusted as discussed above with FIGS. 12-18 to drive the light spectrum to a desired light spectrum.

In some embodiments, the light signals 116a, 116b, and 116c are adjustable in response to adjusting the position of one or more grow lights of the grow light array 100. For example, the light signals 116a, 116b, and 116c move towards each other in response to moving the grow lights 120a, 121a, and 122a towards each other. Further, the light signals 116a, 116b, and 116c move away from each other in response to moving the grow lights 120a, 121a, and 122a away from each other. In this way, the grow lights 120a, 121a, and 122a can be moved to provide a desired 2D digital light map 116.

Figure 26:
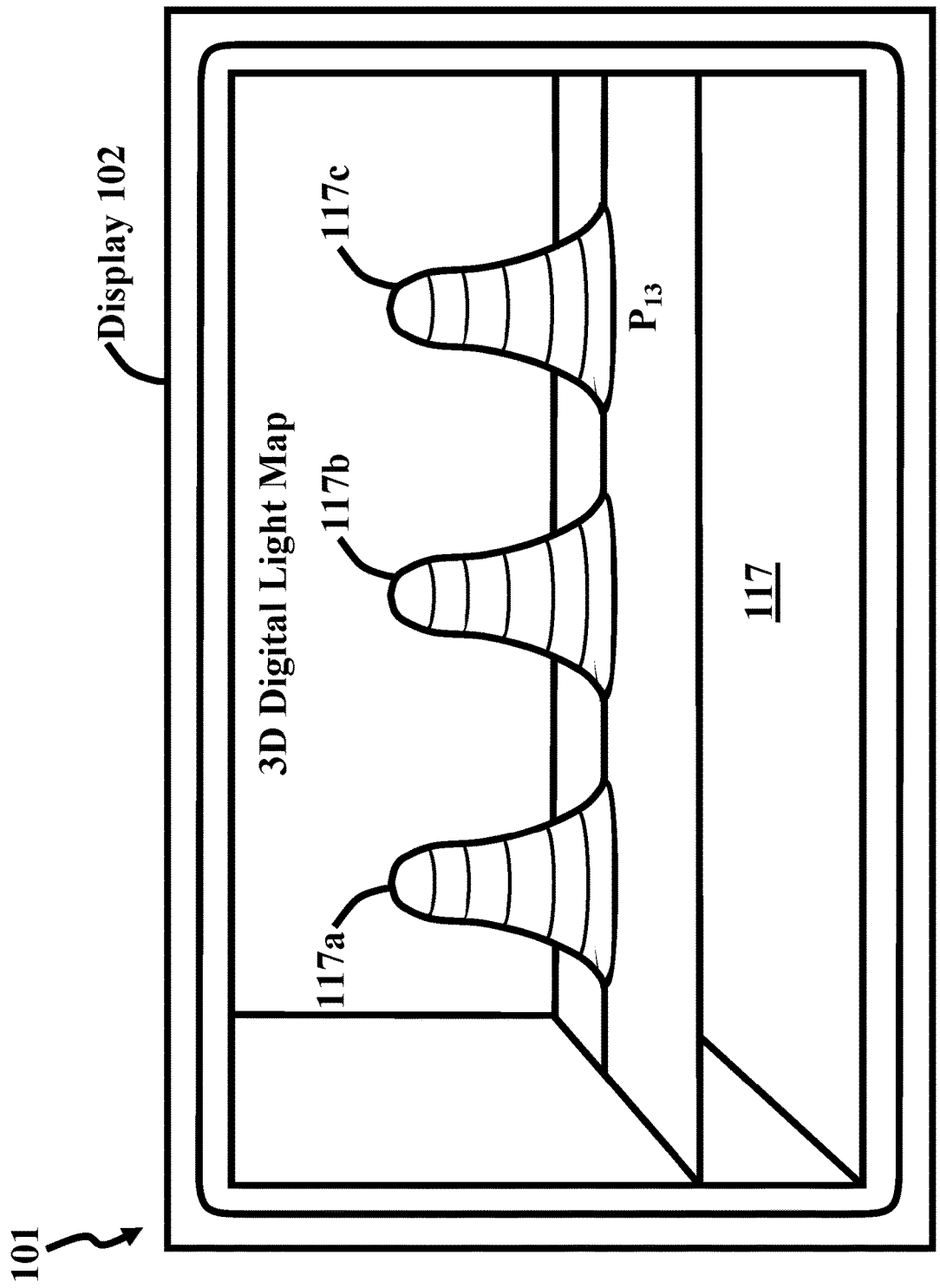
FIG. 26 is a side view of the computer, which includes the display, wherein the display displays a 3D digital light map corresponding to the system of FIG. 23.

FIG. 26 is a side view of the computer 101, which includes the display 102, wherein the display 102 displays a 3D digital light map 117. The computer 101 is discussed in more detail above with FIG. 20. In this embodiment, the 3D digital light map 117 corresponds to light sensed by the sensor array 140 (FIG. 23). The light can be provided in many different ways, such as by the grow light array 100 and/or by an ambient light source, such as the sun.

The 3D digital light map 117 generally includes one or more light signals, wherein the light signals are adjustable. In this embodiment, the 3D digital light map 117 includes light signals 117a, 117b, and 117c, which are positioned at positions corresponding to positions $P_{11}$, $P_{12}$, and $P_{13}$, respectively. The light signals 117a, 117b, and 117c can be adjustable in many different ways.

In some embodiments, the light signals 117a, 117b, and 117c are adjustable in response to adjusting the operation of the grow light array 100. For example, in some situations, the operation of the grow light array 100 is adjustable to adjust the spectrum of the light signals 117a, 117b, and 117c. The spectrum of the light signals 117a, 117b, and 117c can be adjusted in many different ways. For example, the light spectrum of the light signals 117a, 117b, and 117c can be adjusted as discussed above with FIGS. 5-11 to drive the light spectrum to a desired light spectrum. In another example, the light spectrum of the light signals 117a, 117b, and 117c can be adjusted as discussed above with FIGS. 12-18 to drive the light spectrum to a desired light spectrum.

In some embodiments, the light signals 117a, 117b, and 117c are adjustable in response to adjusting the position of one or more grow lights of the grow light array 100. For example, the light signals 117a, 117b, and 117c move towards each other in response to moving the grow lights 120a, 121a, and 122a towards each other. Further, the light signals 117a, 117b, and 117c move away from each other in response to moving the grow lights 120a, 121a, and 122a away from each other. In this way, the grow lights 120a, 121a, and 122a can be moved to provide a desired 3D digital light map 117.

The embodiments of the disclosure described herein are exemplary and numerous modifications, variations and rearrangements can be readily envisioned to achieve substantially equivalent results, all of which are intended to be embraced within the spirit and scope of the disclosure as defined in the appended claims.

The invention claimed is:

1. An apparatus for controlling light criteria in response to a target parameter, the apparatus, comprising:
   a computer;
   a controller operatively coupled to the computer; and
   a grow light array operatively coupled to the controller, wherein the grow light array includes a first grow light that outputs light controllable by the controller; and
   a sensor array operatively coupled to the computer and the controller, wherein a first sensor of the sensor array is carried by the first grow light;
   wherein the computer is configured to provide the target parameter to the controller;
   wherein the controller is configured to receive sensor data from the sensor array, determine a light sense parameter based at least in part on the sensor data, receive the target parameter from the computer, and adjust a spectrum of light output by the grow light array to drive the light sense parameter to match a desired light sense parameter of the target parameter; and
   wherein the computer is configured to receive sensor data from the sensor array and cause a display to display a digital light map based at least in part on the sensor data and the target parameter.

2. The apparatus of claim 1, wherein the light sense parameter corresponds to a light spectrum parameter from the grow light array.

3. The apparatus of claim 1, wherein the light sense parameter corresponds to a daily micro-mol quantity and color ratio for a plant.

4. The apparatus of claim 1, wherein the light sense parameter corresponds to ambient light.

5. The apparatus of claim 1, wherein the light sense parameter corresponds to light from the grow light array and ambient light.

6. The apparatus of claim 1, wherein the controller adjusts a first color spectrum of light.

7. The apparatus of claim 6, wherein the controller adjusts a second color spectrum of light.

8. The apparatus of claim 1, further including the display which displays the digital light map corresponding to the light sense parameter.

9. The apparatus of claim 1, wherein the grow light array and the sensor array are disposed internal or external to a housing comprising the controller.

10. An apparatus for controlling light criteria in response to a target parameter, the apparatus, comprising:
    a computer;
    a controller operatively coupled to the computer; and
    a grow light array operatively coupled to the computer and the controller, wherein the grow light array includes
       a light emitting diode that outputs light, the light emitting diode operatively coupled to the controller; and
       a sensor operatively coupled to the computer and the controller, wherein the sensor is carried by the grow light array;
    wherein the controller is configured to receive sensor data from the sensor, determine a light spectrum sense parameter based at least in part on the sensor data, and adjust a spectrum of light output from the light emitting diode to drive the light spectrum sense parameter to match a desired light spectrum sense parameter of the target parameter;
    wherein the controller is configured to receive the target parameter from the computer and adjusts the spectrum of light output from the light emitting diode based on the target parameter; and
    wherein the computer is configured to receive sensor data from the sensor and cause a display to display a digital light map based at least in part on the sensor data and based at least in part on the target parameter.

11. The apparatus of claim 10, wherein the light spectrum sense parameter corresponds to light from the grow light array and ambient light.

12. The apparatus of claim 10, wherein the controller adjusts a first color spectrum of light.

13. The apparatus of claim 12, wherein the first color spectrum of light is adjusted with time.

14. The apparatus of claim 12, wherein the controller adjusts a second color spectrum of light.

15. The apparatus of claim 14, wherein the second color spectrum of light is adjusted with time.

16. The apparatus of claim 14, further including the display which displays the digital light map, the digital light map being adjusted with the time.

17. An apparatus, comprising:
    a computer system comprising a display;
    a controller operatively coupled to the computer;
    a grow light array operatively coupled to the controller, wherein the grow light array includes a light emitting diode; and
    a sensor operatively coupled to the computer system and the controller, wherein the sensor is carried by the grow light array;
    wherein the controller receives sensor data from the sensor indicative of a spectrum of light, determines a light spectrum sense parameter based at least in part on the sensor data, and adjusts the spectrum of light to drive the light spectrum sense parameter to match a desired spectrum of light; and
    wherein the computer receives sensor data from the sensor array and causes the display to display the spectrum of light and the desired spectrum of light.

18. The apparatus of claim 17, wherein the light spectrum sense parameter corresponds to light from the grow light and ambient light.

19. The apparatus of claim 17, wherein the controller adjusts a first color spectrum of light, and the display displays the first color spectrum of light being adjusted.

20. The apparatus of claim 19, wherein the first color spectrum of light is adjusted with time, and the display displays the first color spectrum of light being adjusted with time.

* * * * *